(12) United States Patent
Purkayastha et al.

(10) Patent No.: US 11,350,325 B2
(45) Date of Patent: May 31, 2022

(54) SIGNALING OF DELTA CONFIGURATION FOR HANDOVER

(71) Applicant: QUALCOMM Incorporated, San Diego, CA (US)

(72) Inventors: Punyaslok Purkayastha, San Diego, CA (US); Ozcan Ozturk, San Diego, CA (US); Xipeng Zhu, San Diego, CA (US); Luis Fernando Brisson Lopes, Swindon (GB); Tom Chin, San Diego, CA (US); Daniel Amerga, San Diego, CA (US); Shailesh Maheshwari, San Diego, CA (US); Kurt Otte, Erie, CO (US); Vanitha Aravamudhan Kumar, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 0 days.

(21) Appl. No.: 17/165,611

(22) Filed: Feb. 2, 2021

(65) Prior Publication Data

US 2021/0250825 A1 Aug. 12, 2021

Related U.S. Application Data

(60) Provisional application No. 62/972,575, filed on Feb. 10, 2020.

(51) Int. Cl.
*H04W 36/00* (2009.01)
*H04W 36/06* (2009.01)
*H04W 76/27* (2018.01)
*H04W 80/02* (2009.01)

(52) U.S. Cl.
CPC ... *H04W 36/0069* (2018.08); *H04W 36/0077* (2013.01); *H04W 36/06* (2013.01); *H04W 76/27* (2018.02); *H04W 80/02* (2013.01)

(58) Field of Classification Search
CPC ......... H04W 36/0069; H04W 36/0077; H04W 36/06; H04W 76/27; H04W 80/02
See application file for complete search history.

(56) References Cited

U.S. PATENT DOCUMENTS

| | | | |
|---|---|---|---|
| 11,212,701 B2* | 12/2021 | Tseng | H04L 1/1825 |
| 2016/0094403 A1* | 3/2016 | Somogyi | H04L 67/10 |
| | | | 709/224 |
| 2018/0359800 A1* | 12/2018 | Wu | H04W 76/27 |
| 2021/0368403 A1* | 11/2021 | Wu | H04W 76/10 |
| 2022/0014971 A1* | 1/2022 | Tang | H04W 80/08 |

* cited by examiner

*Primary Examiner* — Harry H Kim
(74) *Attorney, Agent, or Firm* — Loza & Loza, LLP

(57) ABSTRACT

A delta configuration is signaled for handover of a wireless communication device (e.g., a user equipment, UE) from a first form of connectivity to a second form of connectivity. For example, a UE with master cell group (MCG) connectivity may be handed-over to multiple radio access technology-dual connectivity (MR-DC). In some examples, a UE with standalone (SA) connectivity may be handed-over to non-standalone (NSA) connectivity (e.g., dual connectivity). In conjunction with this handover the UE may be signaled as to whether the UE is to reuse a configuration from the first connectivity mode during the second connectivity mode.

30 Claims, 21 Drawing Sheets

SIGNALING OF DELTA CONFIGURATION FOR HANDOVER

CROSS-REFERENCE TO RELATED APPLICATIONS

The present application for patent claims priority to and the benefit of U.S. Provisional Application No. 62/972,575, titled "SIGNALING OF DELTA CONFIGURATION FOR HANDOVER" filed Feb. 10, 2020, and assigned to the assignee hereof and hereby expressly incorporated by reference herein as if fully set forth below in its entirety and for all applicable purposes.

TECHNICAL FIELD

The technology discussed below generally relates to wireless communication and, more particularly but not exclusively, to signaling a delta configuration for handover of a wireless communication device.

INTRODUCTION

A wireless communication network may be deployed over a defined geographical area to provide various types of services (e.g., voice, data, multimedia services, etc.) to users within that geographical area. In a typical implementation, base stations (e.g., corresponding to different cells) are distributed throughout a network to provide wireless connectivity for user equipment (e.g., cell phones) operating within the geographical area served by the network.

At a given point in time, a user equipment (UE) may be served by a given one of these base stations. As the UE roams throughout the geographical area, the UE may move away from its serving base station and move closer to another base station. In addition, signal conditions within a given cell may change, whereby a UE terminal may be better served by another base station. In these cases, to maintain mobility for the UE, the UE may be handed-over from its serving base station to another base station.

SUMMARY

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method for wireless communication at a wireless communication device (e.g., a UE) is disclosed. The method includes using a source configuration for master cell group (MCG) connectivity, receiving a message associated with handover of the wireless communication device from the MCG connectivity to multiple radio access technology-dual connectivity (MR-DC), determining that the message does not include a full configuration indication, and configuring a secondary cell group (SCG) configuration for the MR-DC by reusing the source configuration as a result of the determining that the message does not include the full configuration indication.

Another example provides a wireless communication device (e.g., a UE) for a wireless communication network. The user equipment includes a transceiver configured to communicate with a radio access network, a memory, and a processor coupled to the transceiver and the memory. The processor and the memory are configured to use a source configuration for master cell group connectivity, receive a message associated with handover of the wireless communication device from the MCG connectivity to multiple radio access technology-dual connectivity (MR-DC), determine that the message does not include a full configuration indication, and configure a secondary cell group (SCG) configuration for the MR-DC by reusing the source configuration as a result of the determination that the message does not include the full configuration indication.

Another example provides a wireless communication device (e.g., a UE) for a wireless communication network. The wireless communication device includes means for using a source configuration for master cell group connectivity, means for receiving a message associated with handover of the wireless communication device from the MCG connectivity to multiple radio access technology-dual connectivity (MR-DC), means for determining that the message does not include a full configuration indication, and means for configuring a secondary cell group (SCG) configuration for the MR-DC by reusing the source configuration as a result of the determining that the message does not include the full configuration indication.

Another example provides an article of manufacture for use by a wireless communication device (e.g., a UE) in a wireless communication network. The article of manufacture includes a computer-readable medium having stored therein instructions executable by one or more processors of the wireless communication device to use a source configuration for master cell group connectivity, receive a message associated with handover of the wireless communication device from the MCG connectivity to multiple radio access technology-dual connectivity (MR-DC), determine that the message does not include a full configuration indication, and configure a secondary cell group (SCG) configuration for the MR-DC by reusing the source configuration as a result of the determination that the message does not include the full configuration indication.

Another example provides a method for wireless communication at a wireless communication device (e.g., a UE). The method includes receiving a message associated with handover of the wireless communication device from a first connectivity mode to a second connectivity mode. At least one of the first connectivity mode or the second connectivity mode is a multi-connectivity mode. The method further includes determining that the message indicates that the wireless communication device is to reuse a first configuration associated with the first connectivity mode for the second connectivity mode, and obtaining a second configuration for the second connectivity mode based on the first configuration as a result of the determining that the message indicates that the wireless communication device is to reuse the first configuration.

Another example provides a wireless communication device (e.g., a UE) for a wireless communication network. The user equipment includes a transceiver configured to communicate with a radio access network, a memory, and a processor coupled to the transceiver and the memory. The processor and the memory are configured to receive a message associated with handover of the wireless communication device from a first connectivity mode to a second connectivity mode. At least one of the first connectivity mode or the second connectivity mode is a multi-connectivity mode. The processor and the memory are further configured to determine that the message indicates that the wireless communication device is to reuse a first configuration associated with the first connectivity mode for the second connectivity mode, and obtain a second configuration for the second connectivity mode based on the first configuration as a result of the determination that the message indicates that the wireless communication device is to reuse the first configuration.

Another example provides a wireless communication device (e.g., a UE) for a wireless communication network. The device includes means for receiving a message associated with handover of the wireless communication device from a first connectivity mode to a second connectivity mode. At least one of the first connectivity mode or the second connectivity mode is a multi-connectivity mode. The apparatus further includes means for determining that the message indicates that the wireless communication device is to reuse a first configuration associated with the first connectivity mode for the second connectivity mode, and means for obtaining a second configuration for the second connectivity mode based on the first configuration as a result of the determining that the message indicates that the wireless communication device is to reuse the first configuration.

Another example provides an article of manufacture for use by a wireless communication device (e.g., a UE) in a wireless communication network. The article of manufacture includes a computer-readable medium having stored therein instructions executable by one or more processors of the wireless communication device to receive a message associated with handover of the wireless communication device from a first connectivity mode to a second connectivity mode. At least one of the first connectivity mode or the second connectivity mode is a multi-connectivity mode. The computer-readable medium also has stored therein instructions executable by one or more processors of the wireless communication device to determine that the message indicates that the wireless communication device is to reuse a first configuration associated with the first connectivity mode for the second connectivity mode, and obtain a second configuration for the second connectivity mode based on the first configuration as a result of the determination that the message indicates that the wireless communication device is to reuse the first configuration.

Another example provides a method for wireless communication at a base station. The method includes determining that a wireless communication device (e.g., a UE) is to be handed-over from master cell group connectivity to multiple radio access technology-dual connectivity (MR-DC), generating a message as a result of the determination, and sending the message to the wireless communication device. The message indicates whether delta signaling is applicable to a secondary cell group (SCG) configuration for the MR-DC.

Another example provides a base station that includes a processor, a transceiver, and a memory that are communicatively coupled to one another. The processor and the memory are configured to determine that a wireless communication device (e.g., a UE) is to be handed-over from master cell group connectivity to multiple radio access technology-dual connectivity (MR-DC), generate a message as a result of the determination, and send the message to the wireless communication device. The message indicates whether delta signaling is applicable to a secondary cell group (SCG) configuration for the MR-DC.

Another example provides a base station. The base station includes means for determining that a wireless communication device (e.g., a UE) is to be handed-over from master cell group connectivity to multiple radio access technology-dual connectivity (MR-DC), means for generating a message as a result of the determination, and means for sending the message to the wireless communication device. The message indicates whether delta signaling is applicable to a secondary cell group (SCG) configuration for the MR-DC.

Another example provides an article of manufacture for use by a base station in a wireless communication network. The article of manufacture includes a computer-readable medium having stored therein instructions executable by one or more processors of the base station to determine that a wireless communication device (e.g., a UE) is to be handed-over from master cell group connectivity to multiple radio access technology-dual connectivity (MR-DC), generate a message as a result of the determination, and send the message to the wireless communication device. The message indicates whether delta signaling is applicable to a secondary cell group (SCG) configuration for the MR-DC.

Another example provides a method of communication for an apparatus. The method includes determining that a wireless communication device (e.g., a UE) is to be handed-over from a first connectivity mode to a second connectivity mode. At least one of the first connectivity mode or the second connectivity mode is a multi-connectivity mode. The method further includes generating a message as a result of the determination. The message includes an indication of whether the wireless communication device is to reuse a configuration associated with the first connectivity mode for the second connectivity mode. The method further includes sending the message to the wireless communication device.

Another example provides an apparatus that includes a processor, a transceiver, and a memory that are communicatively coupled to one another. The processor and the memory are configured to determine that a wireless communication device (e.g., a UE) is to be handed-over from a first connectivity mode to a second connectivity mode. At least one of the first connectivity mode or the second connectivity mode is a multi-connectivity mode. The processor and the memory are further configured to generate a message as a result of the determination. The message includes an indication of whether the wireless communication device is to reuse a configuration associated with the first connectivity mode for the second connectivity mode. The processor and the memory are further configured to send the message to the wireless communication device.

Another example provides an apparatus. The apparatus includes means for determining that a wireless communication device (e.g., a UE) is to be handed-over from a first connectivity mode to a second connectivity mode. At least one of the first connectivity mode or the second connectivity mode is a multi-connectivity mode. The apparatus further includes means for generating a message as a result of the determination. The message includes an indication of whether the wireless communication device is to reuse a configuration associated with the first connectivity mode for the second connectivity mode. The apparatus further includes means for sending the message to the wireless communication device.

Another example provides an article of manufacture for use by an apparatus in a wireless communication network. The article of manufacture includes a computer-readable medium having stored therein instructions executable by one or more processors of the apparatus to determine that a wireless communication device (e.g., a UE) is to be handed-over from a first connectivity mode to a second connectivity mode. At least one of the first connectivity mode or the second connectivity mode is a multi-connectivity mode. The computer-readable medium also has stored therein instructions executable by one or more processors of the wireless communication device to generate a message as a result of the determination. The message includes an indication of whether the wireless communication device is to reuse a configuration associated with the first connectivity mode for the second connectivity mode. The computer-readable medium also has stored therein instructions executable by one or more processors of the wireless communication device to send the message to the wireless communication device.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

Figure 1:
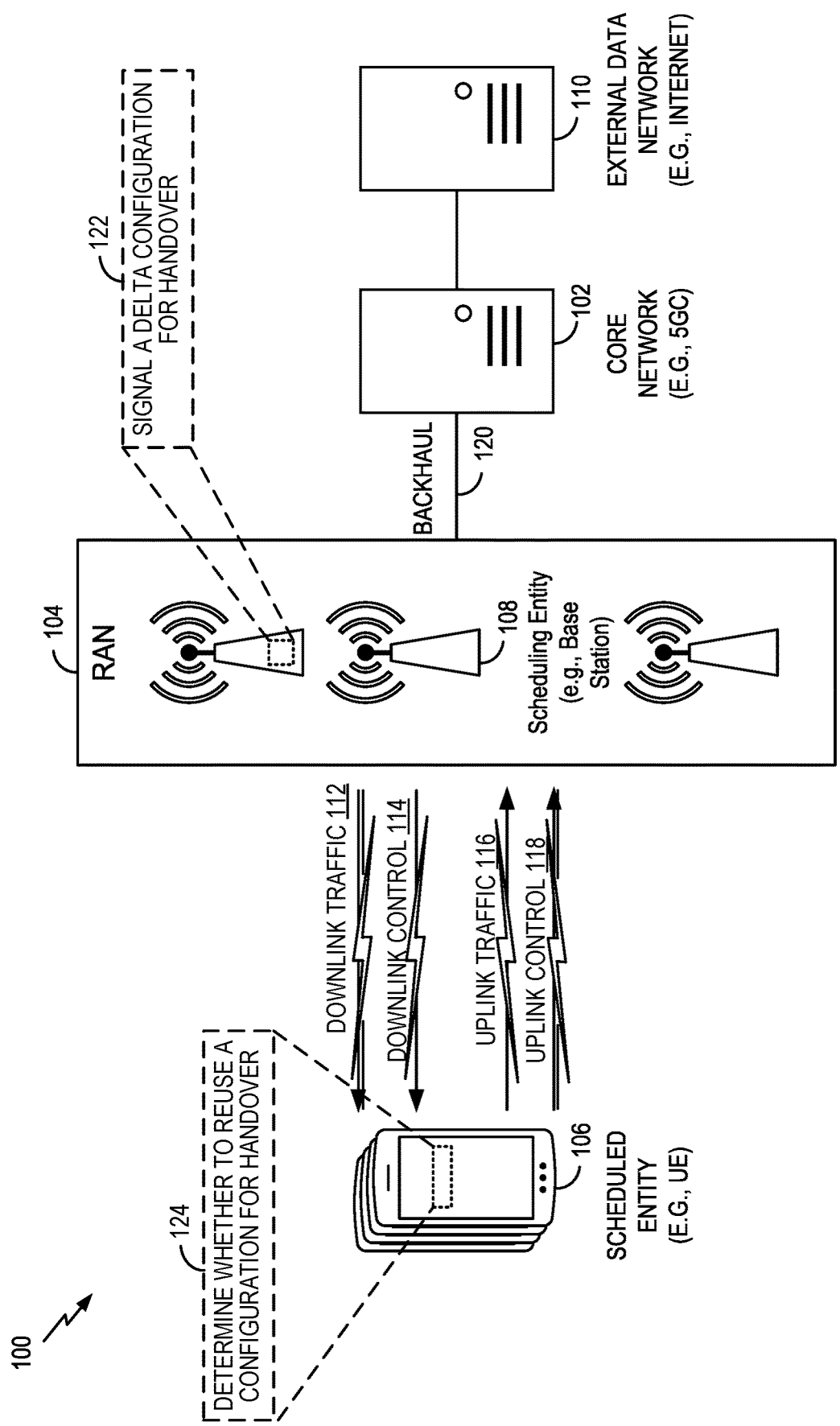
FIG. 1 is a schematic illustration of a wireless communication system according to some aspects

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, examples and/or uses may come about via integrated chip examples and other non-module-component based devices (e.g., end-user devices, vehicles, communication devices, computing devices, industrial equipment, retail/purchasing devices, medical devices, artificial intelligence-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes and constitution.

Various aspects of the disclosure relate to signaling a delta configuration in conjunction with handover of a wireless communication device (e.g., a user equipment, UE) from one form of connectivity to another. For example, a UE with master cell group (MCG) connectivity may be handed-over to multiple radio access technology-dual connectivity (MR-DC). In conjunction with this handover the UE may be signaled as to whether the UE is to reuse a configuration from the first connectivity mode during the second connectivity mode. In some examples, a UE with standalone (SA) connectivity may be handed-over to non-standalone (NSA) connectivity (e.g., dual connectivity). In conjunction with this handover, the UE may be signaled as to whether the UE is to reuse a configuration from SA during NSA.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a base station (BS) 108 in the discussion that follows. By virtue of the wireless communication system 100, the UE 106 may be enabled to carry out data communication with an external data network 110, such as (but not limited to) the Internet.

In some examples, the RAN 104 (e.g., a base station 108) may be configured to signal a delta configuration for handover 122. For example, the base station 108 may indicate to the UE 106 via a message whether a configuration used by the UE at a source node is to be reused at a target node. The base station 108 may further be configured to perform other operations related to the handover.

In some examples, the UE 106 may be configured to determine whether to reuse a configuration for handover 124. In some aspects, this determination may be based on a signaled delta configuration (e.g., received in a message). For example, the UE 106 may reuse at least one configuration (that the UE used at a source cell) when connecting with a target cell for the handover. These and other aspects of configuring a UE for handover are described in more detail after the description of the wireless communication system 100 that follows.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be co-located or non-co-located. The TRPs may communicate on the same carrier frequency or different carrier frequencies within the same frequency band or different frequency bands.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services. In examples where the RAN 104 operates according to both the LTE and 5G NR standards, the UE 106 may be an Evolved-Universal Terrestrial Radio Access Network (E-UTRAN)-New Radio dual connectivity (NR DC) UE (i.e., an EN-DC UE) that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a scheduling entity (described further below; e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
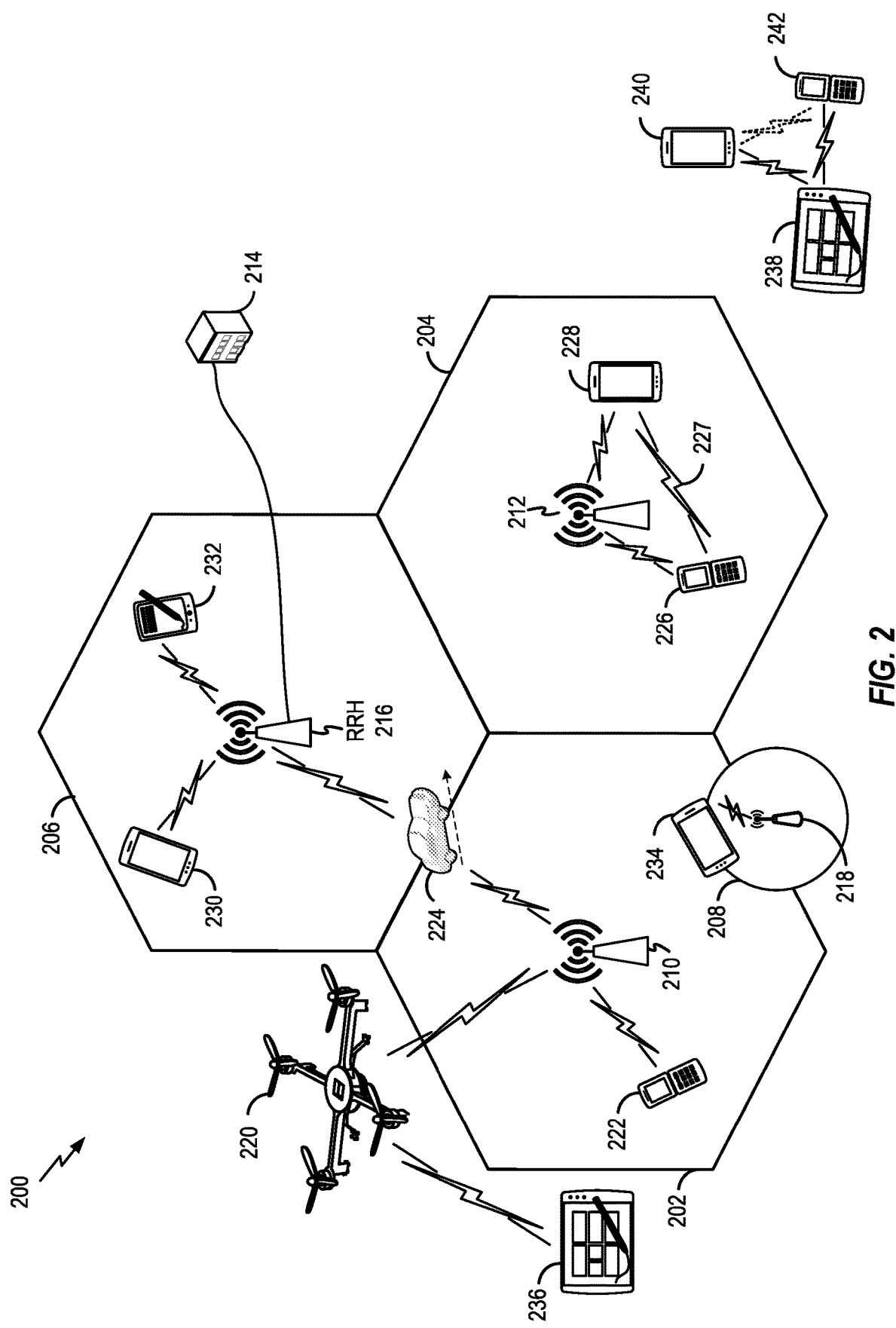
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network (e.g., as illustrated in FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210. In some examples, a UAV 220 may be configured to function as a BS (e.g., serving a UE 236). That is, in some examples, a cell may not necessarily be stationary, and the geographic area of the cell may move according to the location of a mobile base station such as a UAV 220.

In the radio access network 200, the ability for a UE to communicate while moving, independent of its location, is referred to as mobility. The various physical channels between the UE and the radio access network are generally set up, maintained, and released under the control of an access and mobility management function (AMF). The AMF (not shown in FIG. 2) may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the UE 238 (e.g., functioning as a scheduling entity). Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic (e.g., a physical sidelink shared channel) and sidelink control (e.g., a physical sidelink control channel).

In some examples, two or more UEs (e.g., UEs 226 and 228) within the coverage area of a serving base station 212 may communicate with both the base station 212 using cellular signals and with each other using direct link signals (e.g., sidelink signals 227) without relaying that communication through the base station. In an example of a V2X network within the coverage area of the base station 212, the base station 212 and/or one or both of the UEs 226 and 228 may function as scheduling entities to schedule sidelink communication between UEs 226 and 228.

Figure 3:
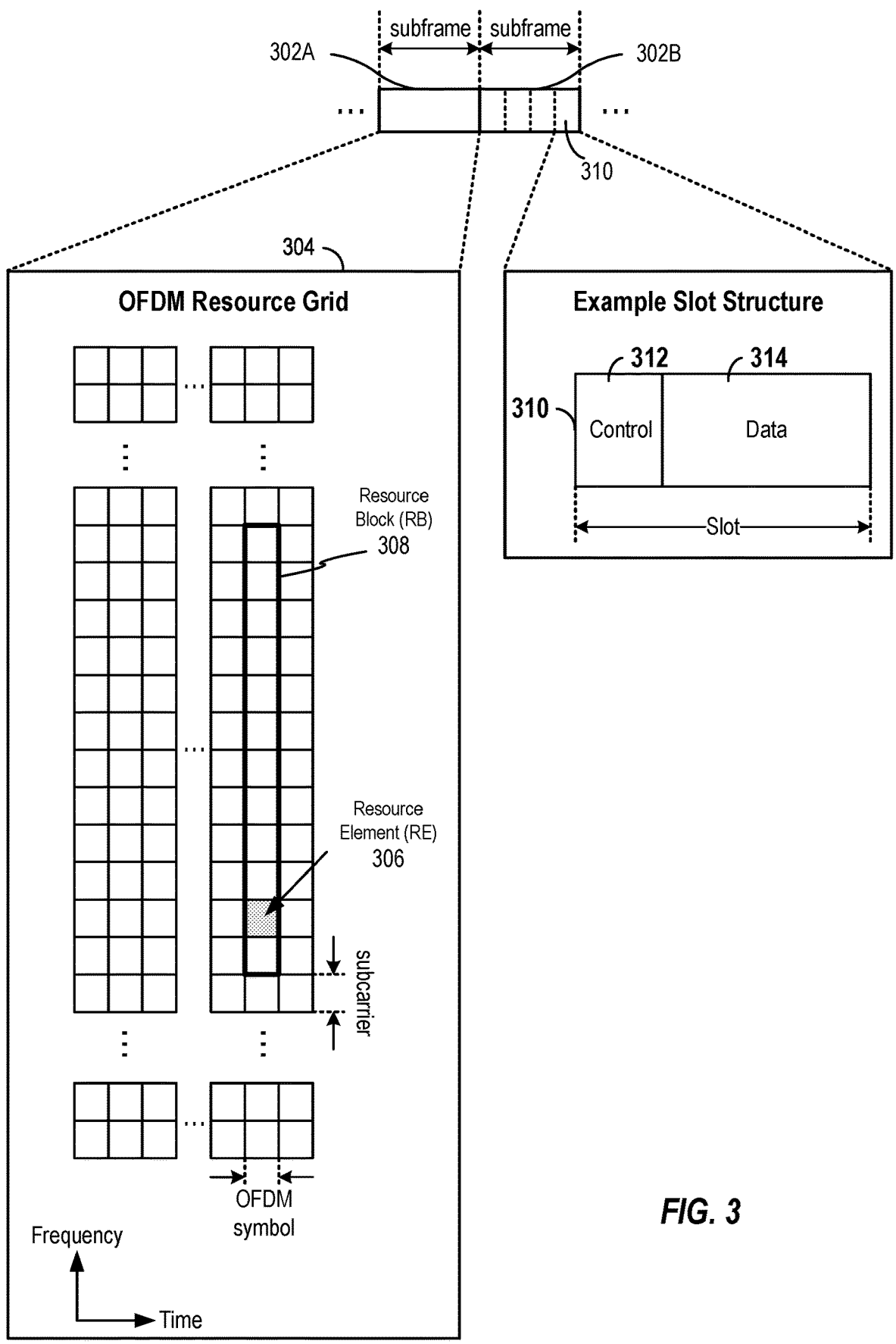
FIG. 3 is a schematic illustration of an example of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example DL subframe (SF) 302A is illustrated, showing an OFDM resource grid 304. However, as those skilled in the art will readily appreciate, the physical layer (PHY) transmission structure for any particular application may vary from the example described here, depending on any number of factors. Here, time is in the horizontal direction with units of OFDM symbols; and frequency is in the vertical direction with units of subcarriers. 5G NR supports a scalable numerology where different numerologies may be used for different radio frequency spectrums, different bandwidths, and the like. For example, sub-carrier spacings (SCSs) of 15 kHz, 30 kHz, 60 kHz, etc., may be used in different scenarios.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink, uplink, or sidelink transmissions typically involves scheduling one or more resource elements 306 within one or more sub-bands or bandwidth parts (BWPs). Each BWP may include two or more contiguous or consecutive RBs. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, RSU, etc.) or may be self-scheduled by a UE implementing D2D sidelink communication.

In this illustration, the RB 308 is shown as occupying less than the entire bandwidth of the subframe 302A, with some subcarriers illustrated above and below the RB 308. In a given implementation, the subframe 302A may have a bandwidth corresponding to any number of one or more RBs 308. Further, in this illustration, the RB 308 is shown as occupying less than the entire duration of the subframe 302A, although this is merely one possible example.

Each 1 ms subframe 302A may consist of one or multiple adjacent slots. In the example shown in FIG. 3, one subframe 302B includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS), a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In some examples, a slot 310 may be utilized for broadcast or unicast communication. In V2X or D2D networks, a broadcast communication may refer to a point-to-multipoint transmission by a one device (e.g., a vehicle, base station (e.g., RSU, gNB, eNB, etc.), UE, or other similar device) to other devices. A unicast communication may refer to a point-to-point transmission by a one device to a single other device.

In an example, the control region 312 of the slot 310 may include a physical downlink control channel (PDCCH) including downlink control information (DCI) transmitted by a base station (e.g., gNB, eNB, RSU, etc.) towards one or more of a set of UEs, which may include one or more sidelink devices (e.g., V2X/D2D devices). In some examples, the DCI may include synchronization information to synchronize communication by a plurality of sidelink devices on the sidelink channel. In addition, the DCI may include scheduling information indicating one or more resource blocks within the control region 312 and/or data region 314 allocated to sidelink devices for sidelink communication. For example, the control region 312 of the slot may further include control information transmitted by sidelink devices over the sidelink channel, while the data region 314 of the slot 310 may include data transmitted by sidelink devices over the sidelink channel. In some examples, the control information may be transmitted within a physical sidelink control channel (PSCCH), while the data may be transmitted within a physical sidelink shared channel (PSSCH).

In a DL transmission (e.g., over the Uu interface), the transmitting device (e.g., the scheduling entity) may allocate one or more REs 306 (e.g., within a control region 312) to carry DL control information including one or more DL control channels, such as a PBCH; and/or a physical downlink control channel (PDCCH), etc., to one or more scheduled entities. The transmitting device may further allocate one or more REs 306 to carry other DL signals, such as a DMRS; a phase-tracking reference signal (PT-RS); a channel state information-reference signal (CSI-RS); a primary synchronization signal (PSS); and a secondary synchronization signal (SSS).

The synchronization signals PSS and SSS, and in some examples, the PBCH and a PBCH DMRS, may be transmitted in a synchronization signal block (SSB) that includes 3 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other nonlimiting examples may utilize greater or fewer than two synchronization signals; may include one or more supplemental channels in addition to the PBCH; may omit a PBCH; and/or may utilize a different number of symbols and/or nonconsecutive symbols for an SSB, within the scope of the present disclosure.

The SSB may be used to send system information (SI) and/or provide a reference to SI transmitted via another channel. Examples of system information may include, but are not limited to, subcarrier spacing, system frame number, a cell global identifier (CGI), a cell bar indication, a list of common control resource sets (coresets), a list of common search spaces, a search space for system information block 1 (SIB1), a paging search space, a random access search space, and uplink configuration information. Two specific examples of coresets include PDCCH CORESET 0 and CORESET 1.

The PDCCH may carry downlink control information (DCI) including but not limited to power control commands, scheduling information, a grant, and/or an assignment of REs for DL and UL transmissions. The PHY carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission (e.g., over the Uu interface), the transmitting device (e.g., the scheduled entity) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., a request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a PDSCH; or for an UL transmission, a physical uplink shared channel (PUSCH). In some examples, one or more REs 306 within the data region 314 may be configured to carry SIBs (e.g., SIB1), carrying system information that may enable access to a given cell.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Example Handover Operations

The disclosure relates in some aspects to handover of a UE between a first mode of operation and a second mode of operation. In some examples, the first mode of operation involves master cell group (MCG) connectivity and the second mode of operation involves multiple radio access technology-dual connectivity (MR-DC).

In some examples, the first mode of operation is a standalone mode of operation and the second mode of operation is a non-standalone mode of operation. In a standalone mode of operation, a device (e.g., a UE) uses a single radio access technology (RAT). Three standalone options are defined by the 3rd Generation Partnership Project (3GPP). Option 1 involves 4G evolved packet core (EPC) and 3GPP Long-Term Evolution (LTE) eNB access (e.g., as in a 4G LTE network). Option 2 involves 5G core network (5GC) and New Radio (NR) gNB access. Option 3 involves 5GC and LTE Next Generation-eNB (ng-eNB) access.

In a non-standalone mode of operation, a device (e.g., a UE) uses multiple radio access technologies (RATs). Three non-standalone options are defined by 3GPP. Option 3 involves using EPC and an LTE eNB acting as a master base station and an NR en-gNB acting as a secondary base station. Option 4 involves 5GC and NR gNB access. Option 5 involves 5GC and ng-eNB access.

In some examples, inter-system (e.g., inter-RAT) handover refers to handover between different types of core networks (e.g., between a 4G evolved packet core (EPC) core network and a 5G core network, 5GC). For example, SA to NSA handover may be used in Evolved Packet System (EPS) fallback scenarios, such as Option 2 (NR connected to 5G core network, 5GC) to Option 3 (E-UTRAN NR-dual connectivity, EN-DC) handover. As a specific example, when a UE with an ongoing high-performance demand data service needs to perform a mobile oriented (MO) or mobile terminated (MT) voice call but Voice over NR (VoNR) is not supported, falling-back to EPS and keeping NR as the secondary node (SN) may help to preserve a good user experience (e.g., by maintaining ongoing data service).

Figure 4:
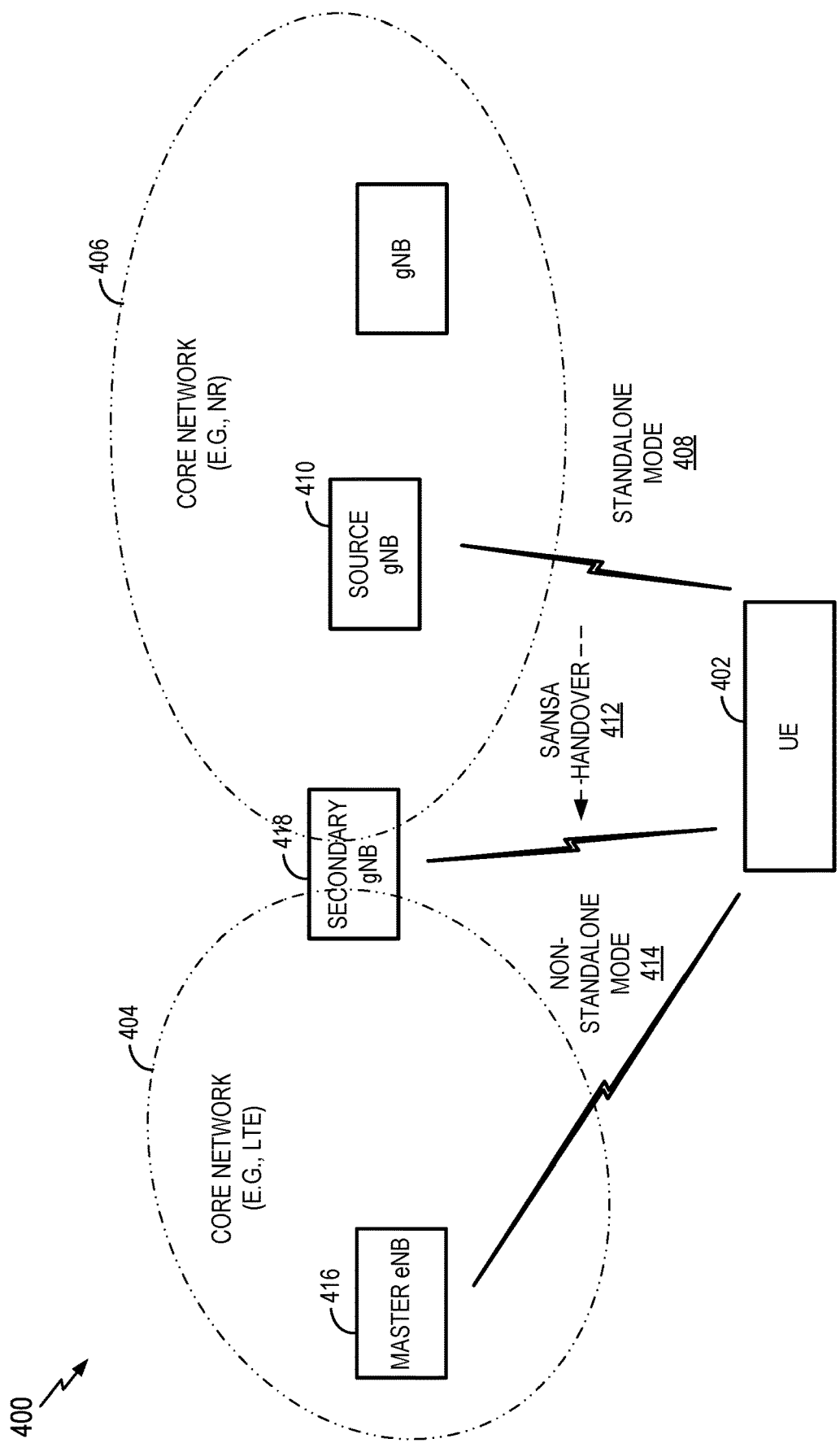
FIG. 4 is a diagram illustrating an example of standalone (SA) to non-standalone (NSA) handover.

FIG. 4 is a schematic illustration of a wireless communication system 400 where a UE 402 may be handed-over from an SA mode to an NSA mode, or vice versa. The wireless communication system 400 includes a first core network 404 (e.g., an LTE network) and a second core network 406 (e.g., an NR network), and potentially other networks (not shown).

In the example, of FIG. 4, the UE 402 may operate in an SA mode 408 whereby the UE 402 is initially connected to a source base station 410 (e.g., a gNB) of the second core network 406. At some point in time, the UE 402 may be subject to an inter-system SA to NSA handover 412 (e.g., to obtain a service via the other network).

In the example of FIG. 4, in an NSA mode 414, the UE 402 may connect to a master base station 416 (e.g., an eNB) in the first core network 404 and a secondary base station (e.g., a gNB) 418. As discussed herein, in some scenarios, the source base station 410 may be designated as the secondary base station for the NSA mode.

In some examples, the source base station 410, the master base station 416, and the secondary base station 418 may correspond to any of the BSs or scheduling entities shown in any of FIGS. 1, 2, 5, 6, 7, 15, 20, and 21. In some examples, the UE 402 may correspond to any of the UEs or scheduled entities shown in any of FIGS. 1, 2, 5, 6, 7, 12, 18, and 19.

SA to NSA inter-system handover may include for, example, Option 2 (NR/5GC) to Option 3 (EN-DC) handover as well as Option 5 (LTE/5GC) to Option 3 (EN-DC) handover. Option 2 to Option 3 handover may be particularly useful. For example, when a UE with an ongoing high-performance demand data service needs to perform a mobile oriented (MO) or mobile terminated (MT) voice call but Voice over NR (VoNR) is not supported by the NR core network, the UE may fall-back to an EPS core network for the voice call while keeping the source NG-RAN node as the secondary node (SN) to preserve a good user experience (e.g., by maintaining the ongoing high-performance data service on the SN).

NSA to SA inter-system handover includes the reverse of the above scenarios. Again, using voice fallback as an example, after the voice call ends, the network may handover the UE from NSA Option 3 to SA Option 2 to save UE power. In the handover, it is possible that the target node does not support DC. Thus, the UE will go back to an SA mode of operation.

Figure 5:
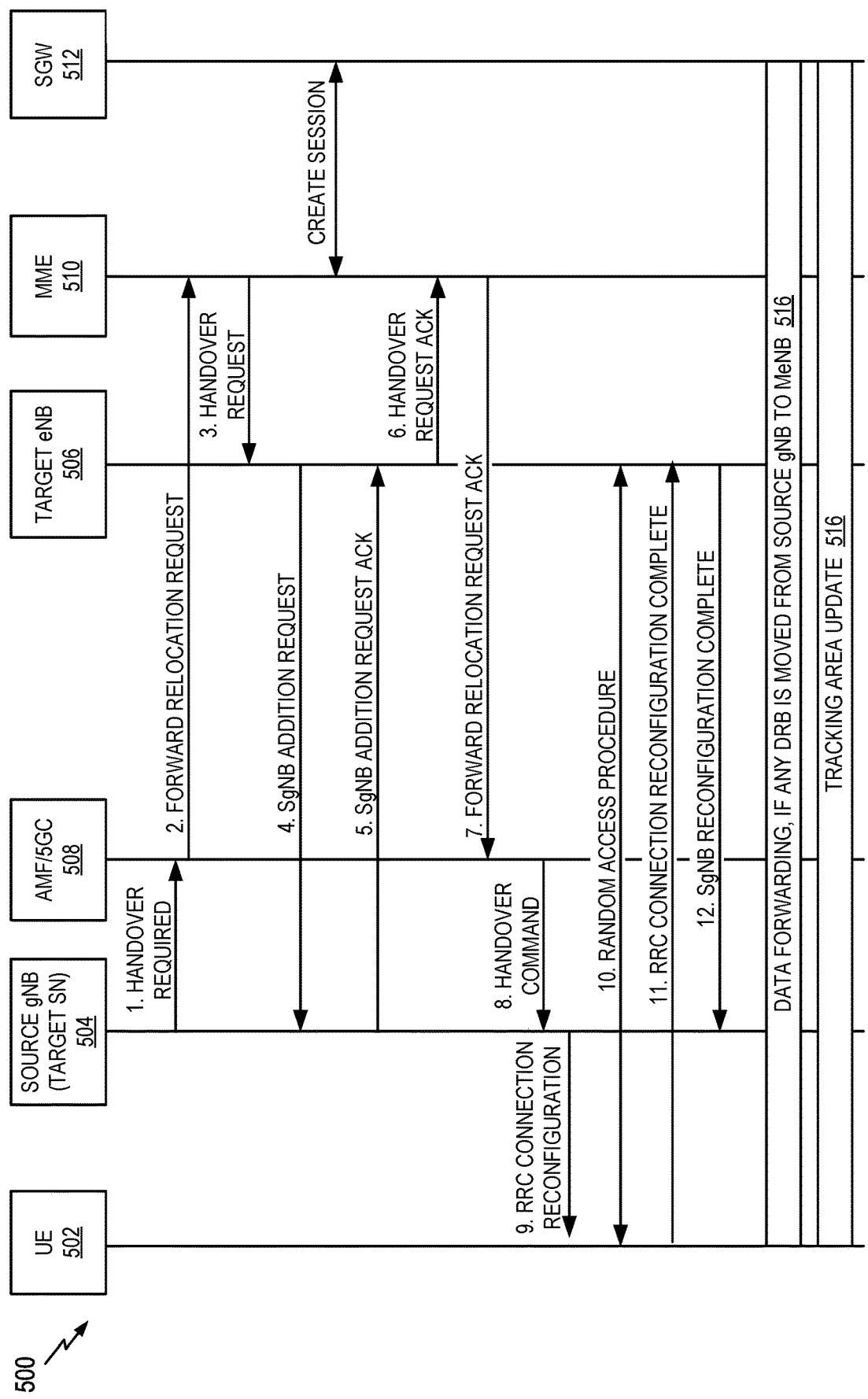
FIG. 5 is a message flow diagram illustrating an example of SA to NSA handover according to some aspects.

FIG. 5 illustrates an example of an NR SA to EN-DC handover procedure 500 where the source gNB is selected as the target SN. In this example, a UE 502 is initially connected to a source base station in an SA mode of operation. The source base station is designated as a Source gNB 504 in FIG. 5. The source base station could take other forms in other implementations. The UE 502 is subsequently handed-over to a target base station. The target base station is designated as a Target eNB 506. The target base station could take other forms in other implementations. In some examples, the source base station and the target base station may correspond to any of the BSs or scheduling entities shown in any of FIGS. 1, 2, 4, 6, 7, 15, 20, and 21. In some examples, the UE 502 may correspond to any of the UEs or scheduled entities shown in any of FIGS. 1, 2, 4, 6, 7, 12, 18, and 19.

At step 1, the Source gNB 504 starts the handover procedure by initiating the Handover Required procedure. In this case, to induce the Target eNB 506 to select the Source gNB 504 as the target SN, the Source gNB 504 may include both an NR measurement result (e.g., candidateCellInfoListNR-r15) and candidate E-UTRA cell information in a radio resource control (RRC) container of an NG-AP Handover Required message and the source NG-RAN node ID.

At step 2, the AMF/5GC 508 sends a Relocation Request to the target mobility management entity (MME) 510. The MME 510 starts to create a session on the serving gateway (SGW) 512. At step 3, the MME 510 sends a Handover Request to the Target eNB 506. Thus, the Target eNB 506 may receive the RRC container of an NG-AP Handover Required message from step 1. At step 4, the Target eNB 506 sends an SgNB Addition Request to the Source gNB 504 which has been selected as the Target SN. For example, based on one or more of the QoS profile of the enhanced radio access bearers (E-RABs) (e.g., forwarded by step 2 and step 3), the DC capability of the UE 502, the NR measurement result, local policy, or a combination thereof, the Target eNB 506 may decide to configure the target secondary gNB (SgNB) for the UE 502. The Source gNB 504 may be preferred here based on the NR measurement result in step 1.

At step 5, the Target SN replies with an SgNB Addition Request Ack. At step 6, the Target eNB 506 replies to the MME 510 with a Handover Request Ack. At step 7, the MME 510 replies to the AMF/5GC 508 with a Relocation Request Ack. At step 8, the AMF/5GC 508 sends a Handover Command to the Source gNB 504. At step 9, the Source gNB 504 triggers the UE 502 to perform the handover and apply the new configuration.

At step 10, the UE 502 synchronizes to the Target eNB 506 (e.g., by conducting a random access procedure). At step 11, the UE 502 replies to the Target eNB 506 with an eNB RRC Connection Reconfiguration complete message. Of note, the UE 502 does not need to synchronize to the Target SN in this procedure since the Source gNB 504 is the target SN.

At step 12, if the RRC connection reconfiguration procedure was successful, the Target eNB 506 informs the Target SN of this via an SgNB Reconfiguration Complete message. The system may then perform data forwarding operations 514, tracking area update operations 516, and other operations as needed.

Figure 6:
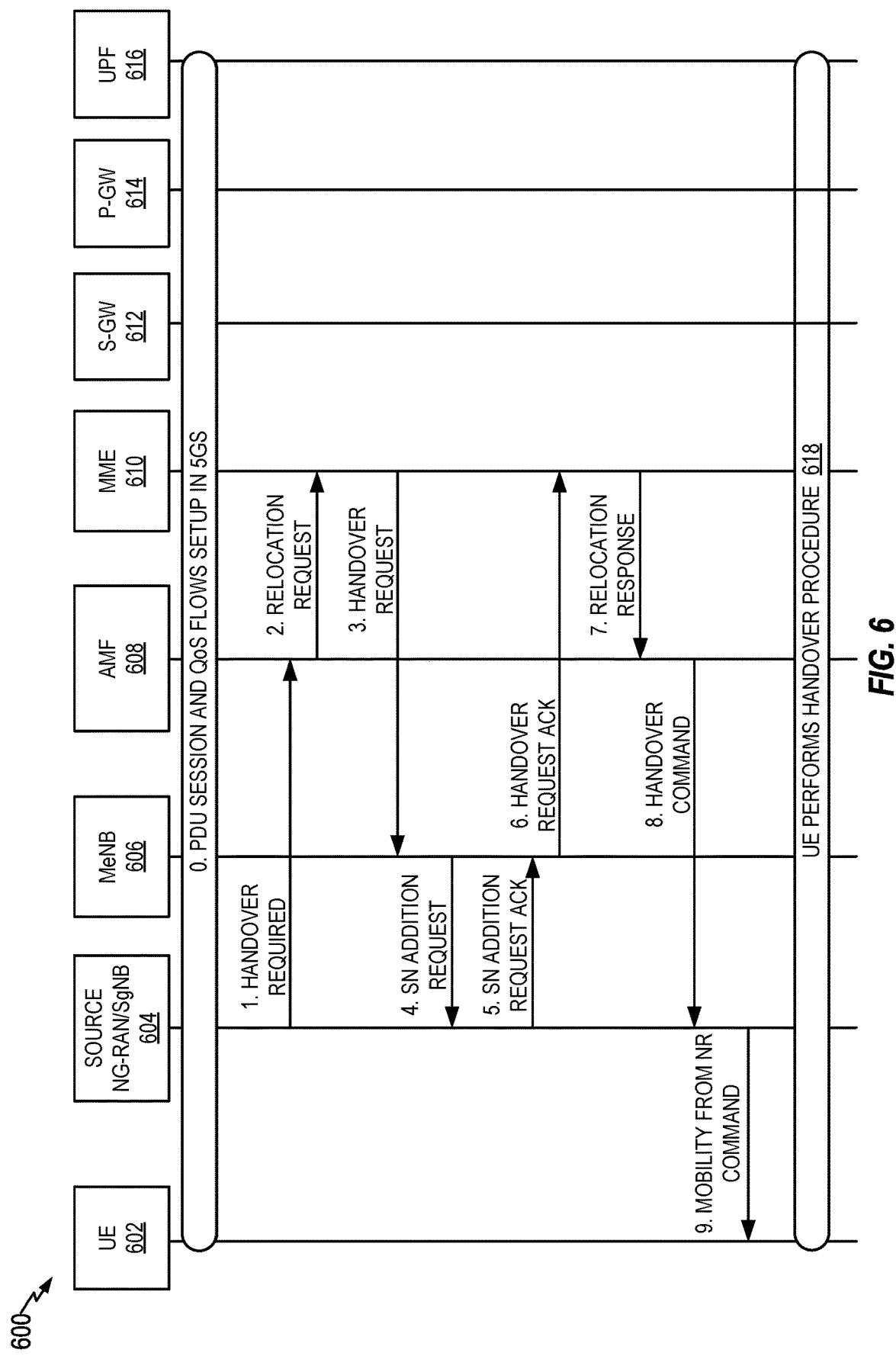
FIG. 6 is a message flow diagram illustrating an example of SA to E-UTRAN NR-dual connectivity (EN-DC) handover according to some aspects.

FIG. 6 illustrates an example of an NR SA to EN-DC handover procedure 600. An NR SA to EN-DC inter-system handover may need to be performed, for example, in a scenario where an IP multimedia subsystem (IMS) voice call is initiated in an NR SA system with ongoing data flows in the case where Voice over NR (VoNR) is not supported. In this case, a handover to an EN-DC system can be performed so that the ongoing data flows are continued over the NR SCG leg while the voice call is carried over an LTE master cell group (MCG) leg.

In this example, a UE 602 is initially connected to a source base station in an SA mode of operation where a protocol data unit (PDU) session and QoS flows are setup in a 5G system (5GS). The source base station is designated as a Source NR-RAN 604 in FIG. 6. The source base station could take other forms in other implementations. The UE 602 is subsequently handed-over to a target base station. The target base station is designated as a Master eNB (MeNB) 606. The target base station could take other forms in other implementations. In some examples, the source base station and the target base station may correspond to any of the BSs or scheduling entities shown in any of FIGS. 1, 2, 4, 5, 7, 15, 20, and 21. In some examples, the UE 602 may correspond to any of the UEs or scheduled entities shown in any of FIGS. 1, 2, 4, 5, 7, 12, 18, and 19.

At step 1, the Source NR-RAN 604 starts the handover procedure by initiating the Handover Required procedure. In this case, to induce the Master eNB 606 to select the Source NR-RAN 604 as the target SN, the Source NR-RAN 604 may include one or more of a Target MeNB ID, a Handover Type (e.g., 5GStoEPS), and a Source to Target Transparent Container. The Source to Target Transparent Container may include UE measurement results, an EPS fallback of IMS voice indication, and an indication that Target SgNB ID=Source NG-RAN node ID).

At step 2, the AMF 608 sends a Relocation Request to the target mobility management entity (MME) 610. The MME 610 starts to create a session on the serving gateway (SGW) 612. At step 3, the MME 610 sends a Handover Request to the Master eNB 606. Thus, the Master eNB 606 may receive the container from step 1. At step 4, the Master eNB 606 sends an SN Addition Request to the Source NR-RAN 604. In some examples, based on one or more of the QoS profile of the enhanced radio access bearers (E-RABs) (e.g., forwarded by step 2 and step 3), the DC capability of the UE 602, the NR measurement result, local policy, or a combination thereof, the Master eNB 606 may decide to configure the target secondary gNB (SgNB) for the UE 602. The Source NR-RAN 604 may be preferred here based on the NR measurement result in step 1.

At step 5, the Target SN replies with an SN Addition Request Ack. At step 6, the Master eNB 606 replies to the MME 610 with a Handover Request Ack. At step 7, the MME 610 replies to the AMF/5GC 608 with a Relocation Response. At step 8, the AMF 608 sends a Handover Command to the Source NR-RAN 604. At step 9, the Source NR-RAN 604 triggers the UE 602 to perform the handover and apply the new configuration.

The UE 602 then performs the handover procedure. Here, the IMS voice call is set up over the MCG leg.

Example Signaling of Delta Configuration

In an NR SA to EN-DC handover, if during handover preparation the target SgNB is selected to be the source NG-RAN node, then the SCG configuration provided to the UE for use after handover may involve few changes compared to the configuration used by the UE before handover. For instance, in the EPS fallback of IMS voice scenario mentioned above, the ongoing data flows related to the data radio bearers (DRBs) can be continued after handover over the SCG leg. Thus, the DRB configurations can be re-used. In this scenario, signaling of the delta configuration in the handover command message carrying the RRC reconfiguration may provide one or more advantages. For example, if a delta configuration is provided, the complexity and time for processing the handover command message at the UE is reduced, which may reduce of handover latency.

Thus, in some handover (e.g., NR SA to EN-DC handover) scenarios (e.g., EPS fallback of IMS voice), if the target SgNB is selected to be the source NG-RAN node, then the SCG configuration provided to the UE in the handover command message may involve relatively few changes compared to the UE configuration before handover. In such scenarios, signaling of a delta configuration for SCG in the handover command message may be advantageous. Signaling of a delta configuration for SCG may have the advantage of reducing the complexity and time for processing the handover message at the UE because parts of the source configurations of protocol layers could be reused, which contributes to a reduction in handover latency.

The disclosure relates in some aspects to using the existing fullConfig IE in the handover command message carrying the RRC reconfiguration to indicate to the UE whether a delta SCG configuration is being provided (e.g., whether the SCG configuration provided is a delta compared to the UE configuration before handover).

In the case of NR SA to EN-DC handover, the fullConfig IE may be interpreted by the UE in the following way in some examples.

If the fullConfig IE is not present, the UE interprets the IE as follows in some examples. The SCG configuration provided is a delta compared to the UE configuration before handover. In particular, the following UE configurations before handover are reused for the SCG: service data application protocol (SDAP) and packet data convergence protocol (PDCP) configurations of DRBs, Physical layer and MAC layer configurations, and radio link control (RLC) configurations of DRBs. Alternatively or in addition, the full MCG configuration may provided in the RRC reconfiguration message.

If the fullConfig IE is present, the UE interprets the IE in a conventional manner in some examples. Full MCG and SCG configurations may be provided in the RRC reconfiguration message.

In the case of NR SA to EN-DC handover, the fullConfig IE in the LTE RRCConnectionReconfiguration message included in MobilityFromNRCommand (handover command message) may be used to indicate to the UE whether the provided NR SCG configuration is a delta compared to the UE configuration before handover.

In the case of NR SA to EN-DC handover, the fullConfig IE may be interpreted by the UE as follows in some examples. If the fullConfig IE is not present, the SCG configuration provided is a delta compared to the UE configuration before handover. The MCG configuration provided is a full configuration. If the fullConfig IE is present, the interpretation may follow the conventional practice, e.g., full MCG and SCG configurations are provided.

In the case of NR SA to EN-DC handover, if a delta SCG configuration is provided, the following UE configurations before handover may be reused for the SCG: SDAP and PDCP configurations of DRBs, Physical layer and MAC layer configurations, and RLC configurations of DRBs.

The disclosure relates in some aspects to signaling of a delta configuration for inter-system handover from a 5G new radio (NR) standalone (SA) mode of operation to an E-UTRAN NR-dual connectivity (EN-DC) mode of operation.

In SA to NSA inter-system handover, if the target SgNB is selected to be the source NG-RAN node, the SCG configuration provided to the UE for use after handover may involve relatively few changes compared to configuration used by the UE before handover. For example, if an IMS voice call is initiated in NR SA and VoNR is not supported, then a handover to EN-DC can be performed so that ongoing data flows are continued over the SCG leg whereas the voice call is carried over the MCG leg.

The disclosure relates in some aspects to using the fullConfig information element (IE) in the RRC reconfiguration message to indicate to the UE whether or not a full SCG configuration is being provided in the handover command for SA to NSA inter-system handover. If a delta configuration is provided, the complexity and time for processing the message can be reduced at the UE. For example, if the UE is able to reuse at least some of the configuration information associated with a source cell, the UE does not need to receive and process this configuration information (e.g., it is already maintained at the UE) in this case. Moreover, if the UE is able to reuse at least some of the configuration information associated with a source cell, the UE does not need to verify that it supports the configuration. In contrast, the UE may need to verify that it supports a configuration that it receives from the network.

In the case of SA to NSA inter-system handover, if the fullConfig IE is present, the UE may interpret this as indicating that full MCG and SCG configurations are provided in the reconfiguration message.

If the fullConfig IE is not present, the UE may interpret this as indicating that: 1) a full MCG configuration is provided in the reconfiguration message; and 2) the SCG configuration provided is a delta compared to the configuration used by the UE before handover.

In some examples, the following configurations of the UE before handover may be reused for the SCG: UE SDAP configurations of data radio bearers (DRBs), UE PDCP configurations of DRBs; UE physical layer; UE MAC layer; and UE RLC configurations of DRBs. Other types of configurations may be reused in accordance with the teachings herein.

Some types of configurations might not be reused. For example, a security configuration may be obtained at the target.

An example of a message definition for fullConfig IE follows in Table 1. In this example, the feature "for handover (HO) from NR to EN-DC, fullConfig indicates whether or not delta signaling is applicable of: SDAP and PDCP configurations of SCG DRBs from the UE SDAP and PDCP configurations of DRBs before handover, and SCG physical layer, MAC layer, and RLC configurations of DRBs from the UE physical layer, MAC layer, and RLC configurations of DRBs before handover" is shown as being incorporated into section 6.2.2 of 3GPPP 36.331 Rel. 15.8. The fullConfig IE may be configured in a different manner in other implementations.

TABLE 1

RRCConnectionReconfiguration-IEs field descriptions fullConfig
Indicates whether the full configuration option is applicable for the RRC
Connection Reconfiguration message for intra-system intra-RAT
handover. For inter-RAT handover from NR to E-UTRA, fullConfig
indicates whether or not delta signalling of SDAP/PDCP from source
RAT is applicable.
For HO from NR to EN-DC, fullConfig indicates whether or not delta
signalling is applicable of:
   SDAP and PDCP configurations of SCG DRBs from the UE SDAP
   and PDCP configurations of DRBs before handover, and
   SCG physical layer, MAC layer, and RLC configurations of DRBs
   from the UE physical layer, MAC layer, and RLC configurations of
   DRBs before handover.

The disclosure relates in some aspects to signaling for handover to E-UTRA. In some examples, the purpose of this procedure is to, under the control of the network, transfer a connection between the UE and another Radio Access Network (e.g., GERAN, UTRAN or NR) to E-UTRAN including the case of NR to EN-DC handover, or transfer a connection between the UE and the E-UTRAN with one type of core network (CN) to the E-UTRAN with a different type of CN.

The handover to E-UTRA procedure applies when signaling radio bearers (SRBs), possibly in combination with DRBs, are established in another RAT or in E-UTRA connected to another type of CN. Handover from UTRAN to E-UTRAN applies after integrity has been activated in UTRAN. Handover to E-UTRA connected to a different type of CN applies after integrity has been activated in E-UTRAN. Handover from NR to E-UTRAN applies after integrity has been activated in NR.

An example of reception of the RRCConnectionReconfiguration message by a UE is described in Table 2. In this example, the feature "if the RRCConnectionReconfiguration message does not include the fullConfig and the UE is performing a handover from NR to EN-DC: configure the SCG physical layer, MAC layer, and RLC configurations of DRBs by re-using the source physical layer, MAC layer, and RLC configurations of DRBs; and configure the SDAP and PDCP configurations of SCG DRBs by re-using the source SDAP and PDCP configurations of DRBs" is shown as being incorporated into section 5.4.2.3 of 3GPPP 36.331 Rel. 15.8. These operations may take other forms in other examples.

TABLE 2

Reception of the RRCConnectionReconfiguration by the UE

If the UE is able to comply with the configuration included in the
RRCConnectionReconfiguration message, the UE shall:
1> if the RRCConnectionReconfiguration message does not include the fullConfig and
the UE is connected to 5GC (i.e., delta signalling during intra 5GC handover):
   2> re-use the source SDAP and PDCP configurations (i.e., current SDAP/PDCP
configurations for all RBs from source RAT prior to the reception of the inter-RAT handover
RRCConnectionReconfiguration message);
1> if the RRCConnectionReconfiguration message does not include the fullConfig and the
UE is performing a handover from NR to EN-DC:
   2> configure the SCG physical layer, MAC layer, and RLC configurations of DRBs by re-
using the source physical layer, MAC layer, and RLC configurations of DRBs;
   2> configure the SDAP and PDCP configurations of SCG DRBs by re-using the source
SDAP and PDCP configurations of DRBs;
1> apply the default physical channel configuration as specified in 9.2.4;
1> apply the default semi-persistent scheduling configuration as specified in 9.2.3;
1> apply the default MAC main configuration as specified in 9.2.2;
1> start timer T304 with the timer value set to t304, as included in the
mobilityControlInfo;
1> consider the target PCell to be one on the frequency indicated by the carrierF req
with a physical cell identity indicated by the targetPhysCellId;
1> start synchronising to the DL of the target PCell;
1> set the C-RNTI to the value of the newUE-Identity;
1> for the target PCell, apply the downlink bandwidth indicated by the dl-Bandwidth;
1> for the target PCell, apply the uplink bandwidth indicated by (the absence or presence
of) the ul-Bandwidth;
1> configure lower layers in accordance with the received
radioResourceConfigCommon;
1> configure lower layers in accordance with any additional fields, not covered in the
previous, if included in the received mobilityControlInfo;
1> perform the radio resource configuration procedure as specified in 5.3.10;
1> if the handoverType in securityConfigHO is set to fivegc-ToEPC:
   2> indicate to higher layer that the CN has changed from 5GC to EPC;
   2> derive the key $K_{eN}$ based on the mapped $K_{ASME}$ key as specified for interworking
between EPS and 5GS in TS 33.501 [86];
   2> store the nextHopChainingCount-r15 value;
1> else if the handoverType in securityConfigHO is set to intra5GC:
   2> if the keyChangeIndicator-r15 received in the securityConfigHO is set to TRUE:
     3> forward nas-Container to the upper layers, if included;
     3> update the $K_{eNB}$ key based on the $K_{AMF}$ key, as specified in TS 33.501 [86];
   2> else:
     3> update the $K_{eNB}$ key based on the current $K_{gNB}$ or the NH, using the
nextHopChainingCount-r15 value indicated in the SecurityConfigHO, as specified in TS
33.501 [86];
   2> store the nextHopChainingCount-r15 value;
1> else if the handoverType in securityConfigHO is set to epc-To5GC:
   2> forward the nas-Container to the upper layers
   2> derive the $K_{eNB}$ key, as specified in TS 33.501 [86];

TABLE 2-continued

Reception of the RRCConnectionReconfiguration by the UE

1> else:
   2> forward the nas-SecurityParamToEUTRA to the upper layers;
   2> derive the $K_{eNB}$ key, as specified in TS 33.401 [32];
1> derive the $K_{RRCint}$ key associated with the integrityProtAlgorithm, as specified in TS 33.401 [32];
1> derive the $K_{RRCenc}$ key and the $K_{UPenc}$ key associated with the cipheringAlgorithm, as specified in TS 33.401 [32];
1> if the received RRCConnectionReconfiguration includes the nr-SecondaryCellGroupConfig:
   2> perform NR RRC Reconfiguration as specified in TS 38.331 [82], clause 5.3.5.3.
1> if the received RRCConnectionReconfiguration includes the sk-Counter:
   2> perform key update procedure as specified in in TS 38.331 [82], clause 5.3.5.7;
1> if the received RRCConnectionReconfiguration includes the nr-RadioBearerConfig1:
   2> perform radio bearer configuration as specified in TS 38.331 [82], clause 5.3.5.6;
1> if the received RRCConnectionReconfiguration includes the nr-RadioBearerConfig2:
   2> perform radio bearer configuration as specified in TS 38.331 [82], clause 5.3.5.6.
1> if the handoverType in securityConfigHO is set to fivegc-ToEPC or if the handoverType-v1530 is not present:
   2> configure lower layers to apply the indicated integrity protection algorithm and the $K_{RRCint}$ key immediately, i.e. the indicated integrity protection configuration shall be applied to all subsequent messages received and sent by the UE, including the message used to indicate the successful completion of the procedure;
   2> configure lower layers to apply the indicated ciphering algorithm, the $K_{RRCenc}$ key and the $K_{UPenc}$ key immediately, i.e. the indicated ciphering configuration shall be applied to all subsequent messages received and sent by the UE, including the message used to indicate the successful completion of the procedure;
1> if the received RRCConnectionReconfiguration includes the sCellToAddModList:
   2> perform SCell addition as specified in 5.3.10.3b;
1> if the RRCConnectionReconfiguration message includes the measConfig:
   2> perform the measurement configuration procedure as specified in 5.5.2;
1> perform the measurement identity autonomous removal as specified in 5.5.2.2a;
1> if the RRCConnectionReconfiguration message includes the otherConfig:
   2> perform the other configuration procedure as specified in 5.3.10.9;
1> if the RRCConnectionReconfiguration message includes wlan-OffloadInfo:
2> perform the dedicated WLAN offload configuration procedure as specified in 5.6.12.2;
1> if the RRCConnectionReconfiguration message includes rclwi-Configuration:
   2> perform the WLAN traffic steering command procedure as specified in 5.6.16.2;
1> if the RRCConnectionReconfiguration message includes lwa-Configuration:
   2> perform the LWA configuration procedure as specified in 5.6.14.2;
1> if the RRCConnectionReconfiguration message includes lwip-Configuration:
   2> perform the LWIP reconfiguration procedure as specified in 5.6.17.2;
1> set the content of RRCConnectionReconfigurationComplete message as follows:
   2> if the UE has radio link failure or handover failure information available in VarRLF-Report and if the RPLMN is included in plmn-IdentityList stored in VarRLF-Report:
      3> include rlf-InfoAvailable;
   2> if the UE has MBSFN logged measurements available for E-UTRA and if the RPLMN is included in plmn-IdentityList stored in VarLogMeasReport and if T330 is not running:
      3> include logMeasAvailableMBSFN;
   2> else if the UE has logged measurements available for E-UTRA and if the RPLMN is included in plmn-IdentityList stored in VarLogMeasReport:
      3> include the logMeasAvailable;
   2> if the UE has Bluetooth logged measurements available and if the RPLMN is included in plmn-IdentityList stored in VarLogMeasReport:
      3> include the logMeasAvailableBT;
   2> if the UE has WLAN logged measurements available and if the RPLMN is included in plmn-IdentityList stored in VarLogMeasReport:
      3> include the logMeasAvailableWLAN;
   2> if the UE has connection establishment failure information available in VarConnEstFailReport and if the RPLMN is equal to plmn-Identity stored in VarConnEstFailReport:
      3> include connEstFailInfoAvailable;
1> submit the RRCConnectionReconfigurationComplete message to lower layers for transmission using the new configuration;
1> if the RRCConnectionReconfiguration message does not include rlf-TimersAndConstants set to setup:
   2> use the default values specified in 9.2.5 for timer T310, T311 and constant N310, N311;
1> if MAC successfully completes the random access procedure:
   2> stop timer T304;
2> apply the parts of the CQI reporting configuration, the scheduling request configuration and the sounding RS configuration that do not require the UE to know the SFN of the target PCell, if any;

TABLE 2-continued

Reception of the RRCConnectionReconfiguration by the UE

2> apply the parts of the measurement and the radio resource configuration that require the UE to know the SFN of the target PCell (e.g. measurement gaps, periodic CQI reporting, scheduling request configuration, sounding RS configuration), if any, upon acquiring the SFN of the target PCell;

NOTE 1:
Whenever the UE shall setup or reconfigure a configuration in accordance with a field that is received it applies the new configuration, except for the cases addressed by the above statements.
2> enter E-UTRA RRC_CONNECTED, upon which the procedure ends;
NOTE 2:
The UE is not required to determine the SFN of the target PCell by acquiring system information from that cell before performing RACH access in the target PCell.
NOTE 3:
If the handover is from NR and target CN is 5GC, the delta configuration on PDCP and SDAP can be used for intra-system inter-RAT handover.

The disclosure relates in some aspects to signaling a delta configuration for other types of inter-system handover that involve multi-connectivity. Examples of multi-connectivity include dual connectivity (DC) and multi-RAT connectivity (e.g., multi-RAT dual connectivity, MR-DC).

A first example relates to standalone NR to NR-DC handover. This involves the secondary node (SN) addition of an NG-RAN node where the master cell group (MCG) before handover becomes the secondary cell group (SCG) after handover.

A second example relates to standalone LTE to LTE dual connectivity handover. Here, the MCG before handover becomes the SCG after handover.

A third example relates to EN-DC to NR. For example, in EN-DC with data flows carried over SCG and IMS voice carried over MCG, once the voice call is over, the network may direct the UE to switch to NR SA. In this case, the UE may be provided a configuration in the handover command that is a delta of the SCG configuration before handover.

A fourth example relates to EN-DC to NR-DC. In some examples, this could be a slight variant of Case 3, where an NR node is added during the switch to NR SA to handle additional data traffic where SCG before handover becomes MCG after handover and also adds a new SCG during handover.

In general, a per node (per cell group) delta configuration indication can be provided in the RRC reconfiguration message. For this general solution, two new IEs may be used.

A fullConfigMCG IE may be included in, for example, the MCG configuration portion of the RRC reconfiguration message. This IE may indicate whether a full MCG configuration is provided.

A fullConfigSCG IE may be included in the SCG configuration portion of the RRC reconfiguration message. This IE may indicate whether a full SCG configuration is provided.

The manner in which a UE interprets the indications in a given scenario (e.g., a particular type of handover) and applies the configuration provided may take different forms in different implementations.

Figure 7:
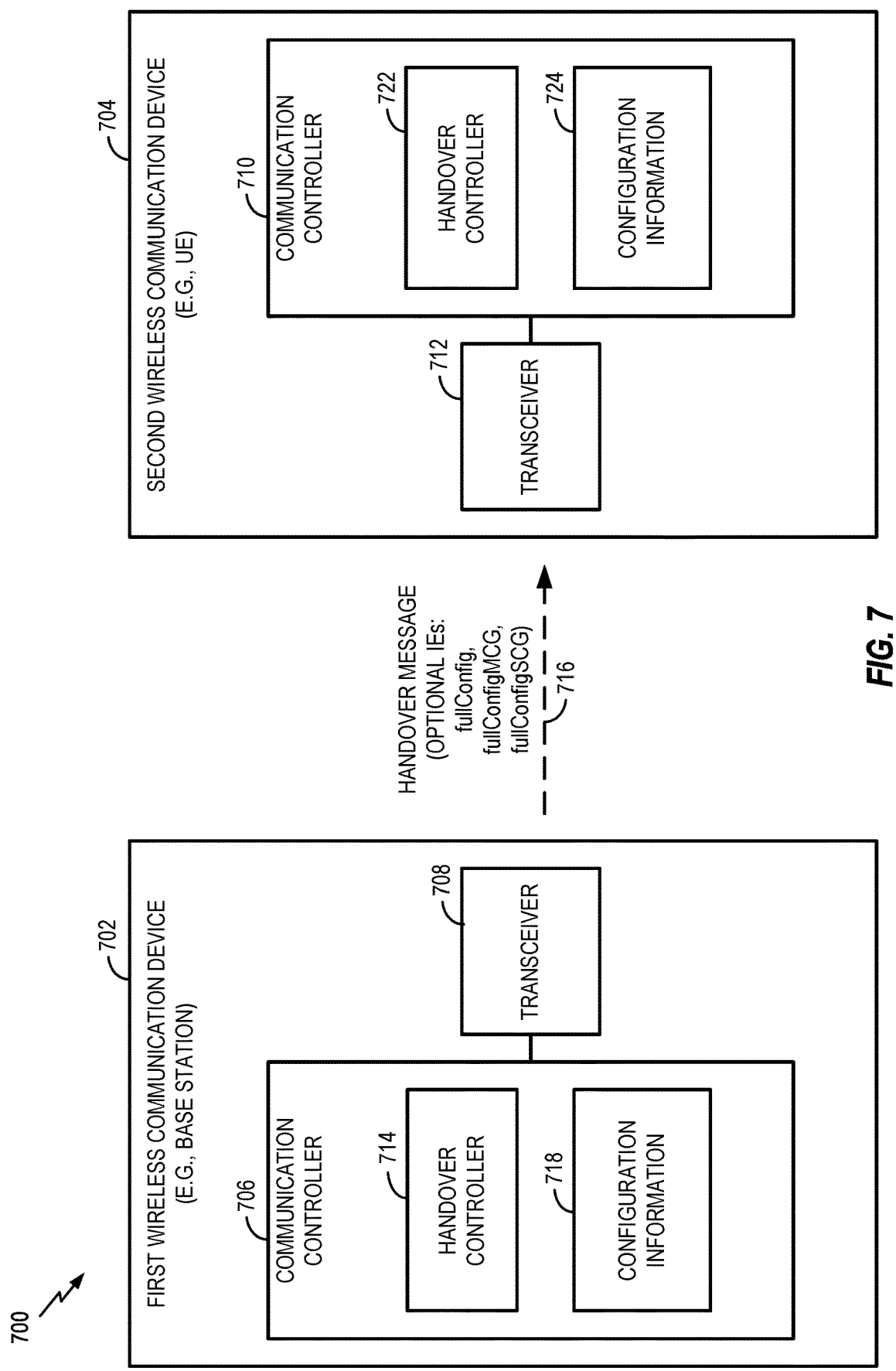
FIG. 7 is a block diagram illustrating a wireless communication system that uses delta signaling according to some aspects.

FIG. 7 is a schematic illustration of a wireless communication system 700 (e.g., the RAN 200 of FIG. 2) that performs handover as taught herein. The wireless communication system 700 includes a first wireless communication device 702 (e.g., a base station) and a second wireless communication device 704 (e.g., a UE), and potentially other devices (not shown). In some examples, the first device 702 may correspond to any of the BSs or scheduling entities shown in any of FIGS. 1, 2, 4, 5, 6, 15, 20, and 21. In some examples, the second device 704 may correspond to any of the UEs or scheduled entities shown in any of FIGS. 1, 2, 4, 5, 6, 7, 12, 18, and 19.

The first device 702 includes a communication controller 706 for controlling communications with (e.g., transmitting to and/or receiving from) the second device 704 and/or other devices via a transceiver 708. The second device 704 includes a communication controller 710 for controlling communications with (e.g. transmitting to and/or receiving from) the first device 702 and/or other devices via a transceiver 712.

The communication controller 706 includes a handover controller 714 for controlling handover at the network side as taught herein. For example, in response to a received handover command, the handover controller 714 may send an RRC ConnectionReconfiguration message 716 to the device 704 via the transceiver 708. In scenarios where the handover controller 714 includes all pertinent configuration information 718 in the message 716, the handover controller 714 may include a fullConfig IE or some other type of indication in the message 716 to indicate whether delta signaling is applicable. As discussed herein, this IE may be a conventional fullConfig IE, a fullConfigMCG IE, or a fullConfigSCG IE. In scenarios where the handover controller does not include all pertinent configuration information 718 in the message 716, the handover controller 714 may omit the fullConfig IE from the message 716.

The communication controller 710 of the second device 704 includes a handover controller 722 for controlling handover at the UE side as taught herein. For example, in response to an RRC ConnectionReconfiguration message 716 received via the transceiver 712 from the device 702, the handover controller 722 may determine whether the message 716 includes a fullConfig IE. If so, the device 704 may obtain configuration information for the handover target from the message 716. If the message 716 does not include a fullConfig IE, the device 704 may obtain configuration information to be reused for the handover target from locally stored configuration information 724 associated with the current source. For example, the configuration information 724 may include one or more of UE SDAP configurations of DRBs, UE PDCP configurations of DRBs, UE physical layer configurations, UE MAC layer configurations, RLC configurations of DRBs, or a combination thereof. The configuration information 724 may include other types of configuration information in other examples.

Figure 8:
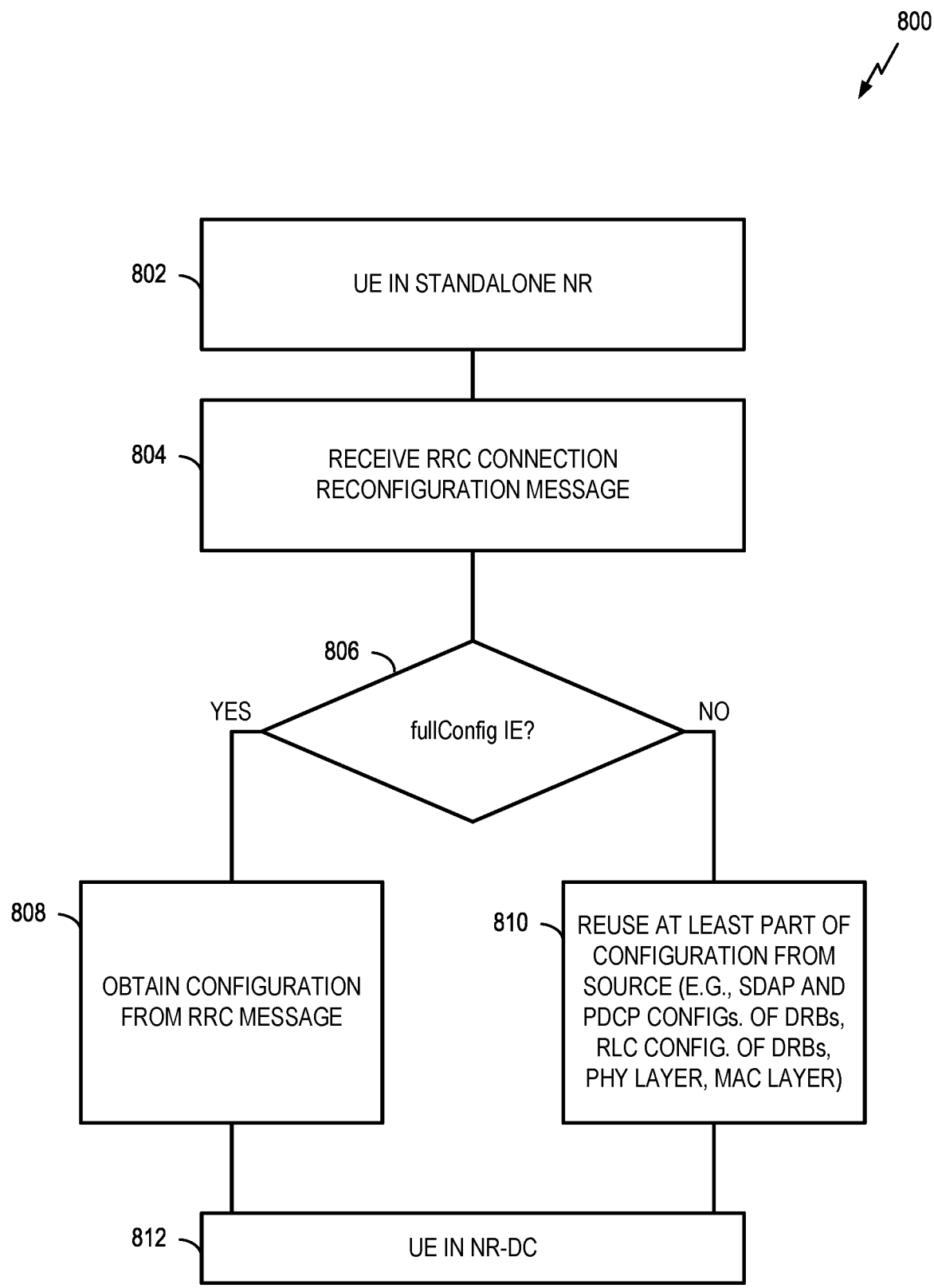
FIG. 8 is a flow diagram illustrating an example of standalone New Radio (NR) to NR dual connectivity (NR-DC) handover according to some aspects.

FIG. 8 illustrates an example of a standalone NR to NR-DC handover according to some examples. At block 802, a UE is in standalone NR (e.g., where the source cell is a 3GPP NG-RAN node). At block 804, the UE receives an RRC connection reconfiguration message. At block 806, the UE determines whether the message includes a fullConfig IE (e.g., a conventional fullConfig IE, a fullConfigMCG IE, or a fullConfigSCG IE). If so, at block 808, the UE uses configuration information from the message to access the target cells. If the message does not include a fullConfig IE (thereby indicating delta signaling), at block 810 the UE obtains at least a portion of the configuration information needed for accessing the target cells from the configuration that the UE used for accessing the source cell. Other information could be obtained from the message as well in some examples. Once the UE obtains the configuration information needed to access the target cells, the UE performs a random access directed to the target cells. In this case, the source cell may be associated with a secondary cell group of the target cells (thereby facilitating reuse of configuration information that was used for accessing the source cell during standalone NR). Upon completion of the handover, the UE is in NR-DC at block 812.

Figure 9:
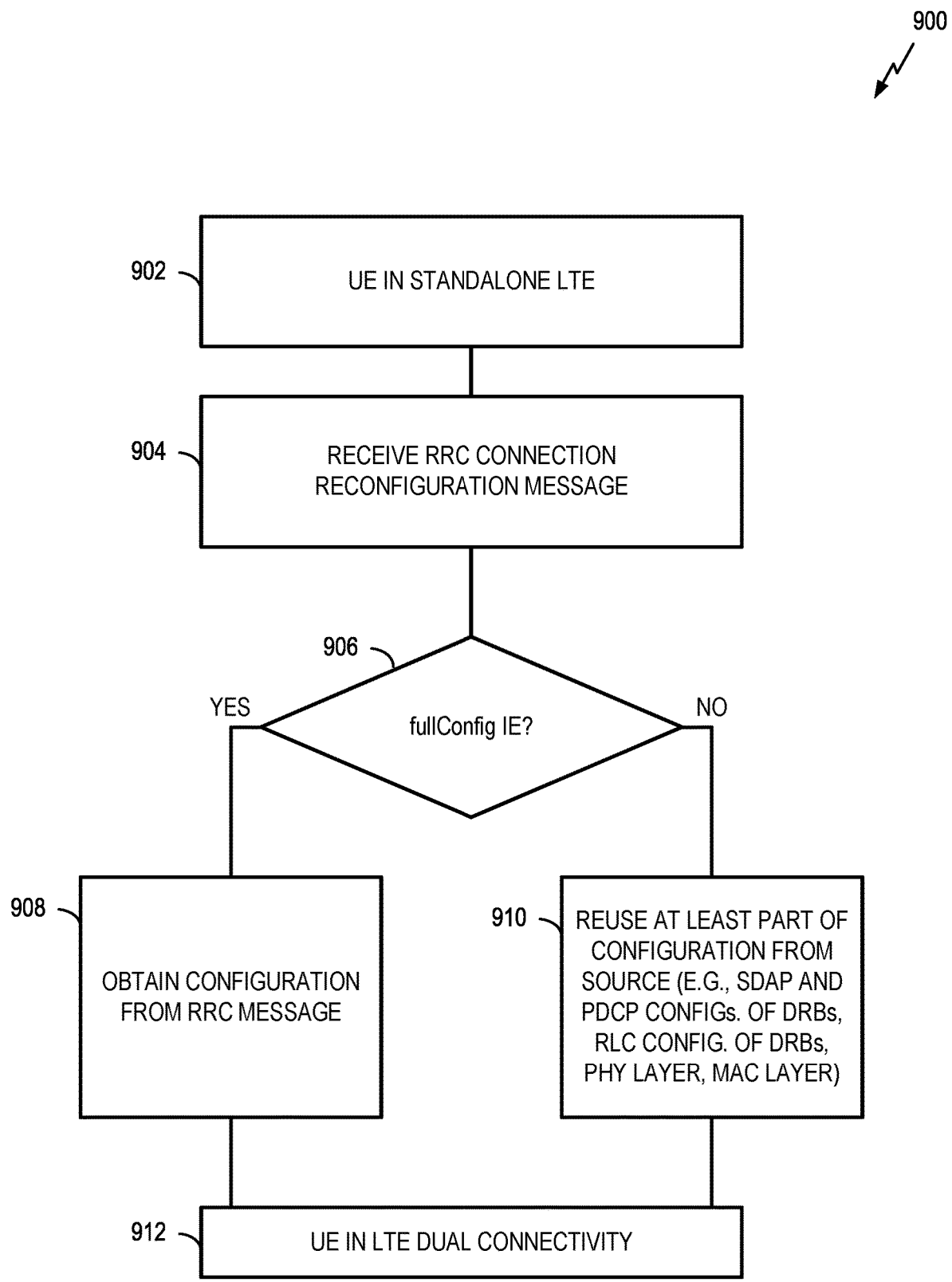
FIG. 9 is a flow diagram illustrating an example of standalone LTE to LTE-DC handover according to some aspects.

FIG. 9 illustrates an example of a standalone LTE to LTE-DC handover according to some examples. At block 902, a UE is in standalone LTE (e.g., where the source cell is a 3GPP E-UTRA node). At block 904, the UE receives an RRC connection reconfiguration message. At block 906, the UE determines whether the message includes a fullConfig IE (e.g., a conventional fullConfig IE, a fullConfigMCG IE, or a fullConfigSCG IE). If so, at block 908, the UE uses configuration information from the message to access the target cells. If the message does not include a fullConfig IE (thereby indicating delta signaling), at block 910 the UE obtains at least a portion of the configuration information needed for accessing the target cells from the configuration that the UE used for accessing the source cell. Other information could be obtained from the message as well in some examples. Once the UE obtains the configuration information needed to access the target cells, the UE performs a random access directed to the target cells. In this case, the source cell may be associated with a secondary cell group of the target cells (thereby facilitating reuse of configuration information that was used for accessing the source cell during standalone LTE). Upon completion of the handover, the UE is in LTE-DC at block 912.

Figure 10:
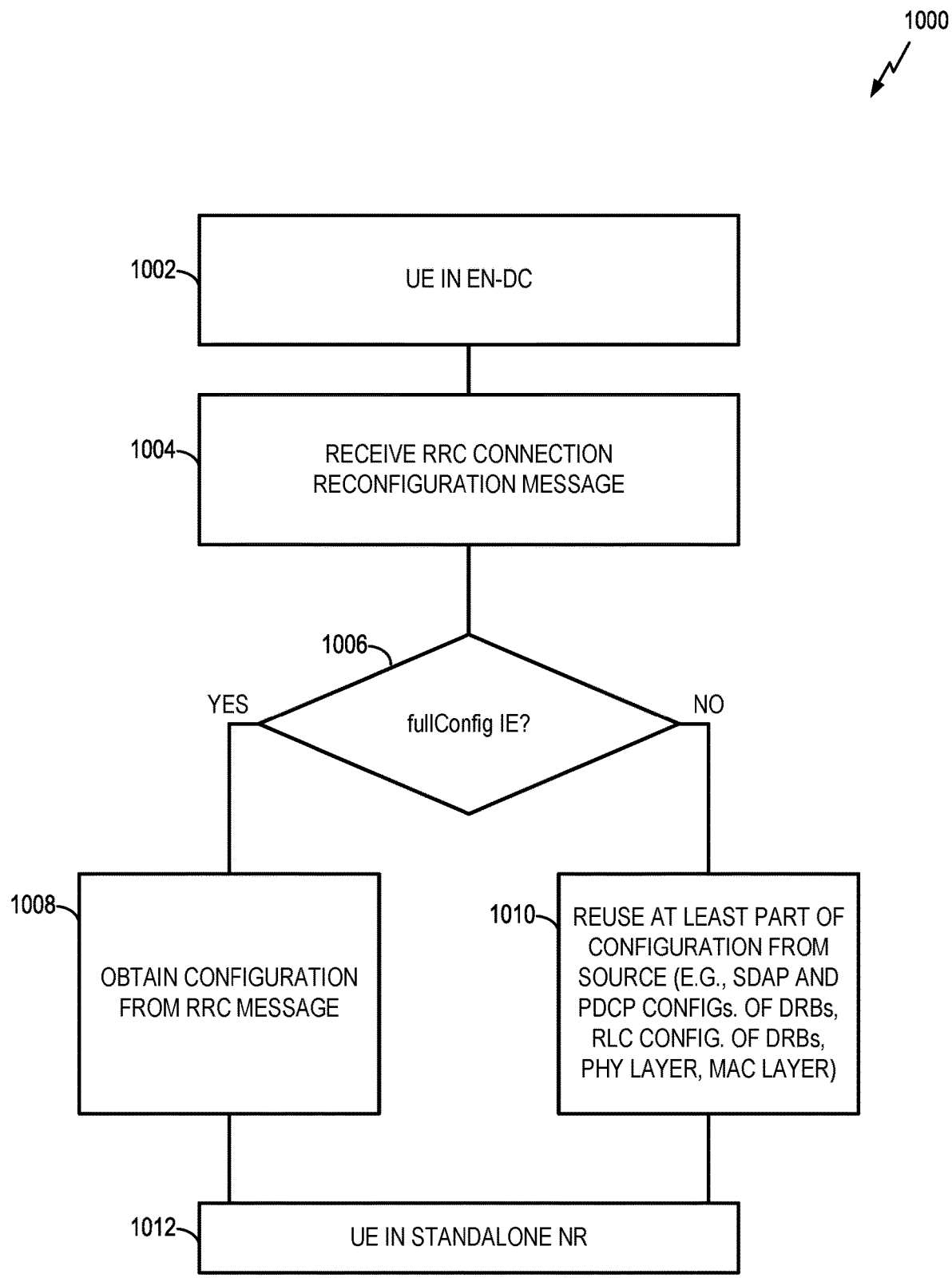
FIG. 10 is a flow diagram illustrating an example of EN-DC to standalone NR handover according to some aspects.

FIG. 10 illustrates an example of an EN-DC to standalone NR handover according to some examples. At block 1002, a UE is in EN-DC (e.g., where one source master cell group is associated with a 3GPP E-UTRA node and source secondary cell group is associated with a 3GPP NG-RAN node). At block 1004, the UE receives an RRC connection reconfiguration message. At block 1006, the UE determines whether the message includes a fullConfig IE (e.g., a conventional fullConfig IE, a fullConfigMCG IE, or a fullConfigSCG IE). If so, at block 1008, the UE uses configuration information from the message to access a target cell. If the message does not include a fullConfig IE (thereby indicating delta signaling), at block 1010 the UE obtains at least a portion of the configuration information needed for accessing a target cell from the configuration that the UE used for accessing the source cell. Other information could be obtained from the message as well in some examples. Once the UE obtains the configuration information needed to access the target cell, the UE performs a random access directed to the target cell. In this case, a source secondary group cell (e.g., a 3GPP NG-RAN node) may be the target cell (thereby facilitating reuse of configuration information that was used for accessing the source cell during EN-DC). Upon completion of the handover, the UE is in standalone NR at block 1012.

Figure 11:
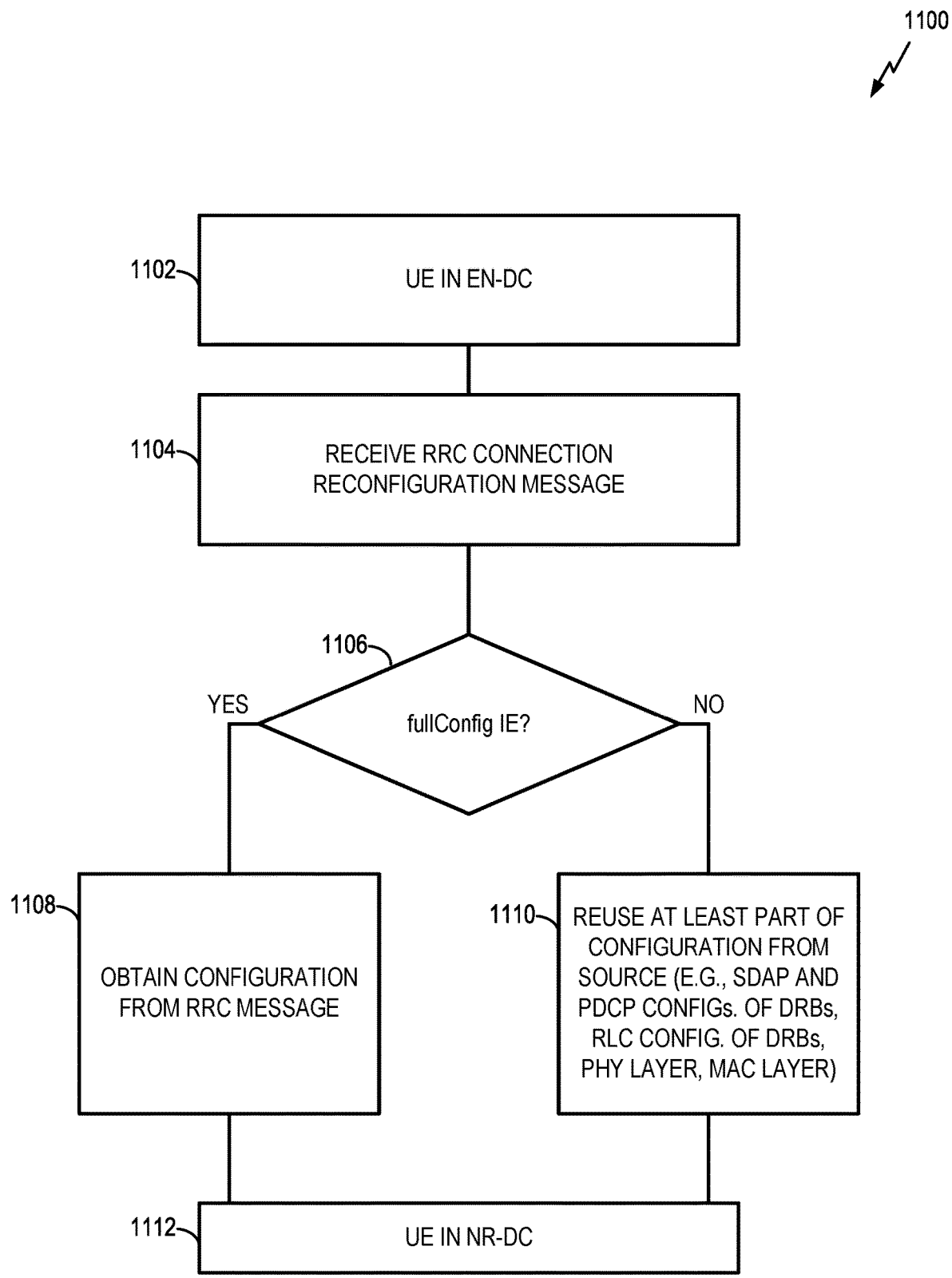
FIG. 11 is a flow diagram illustrating an example of standalone EN-DC to NR-DC handover according to some aspects.

FIG. 11 illustrates an example of an EN-DC to NR-DC handover according to some examples. At block 1102, a UE is in EN-DC (e.g., where one source master cell group is associated with a 3GPP E-UTRA node and source secondary cell group is associated with a 3GPP NG-RAN node). At block 1104, the UE receives an RRC connection reconfiguration message. At block 1106, the UE determines whether the message includes a fullConfig IE (e.g., a conventional fullConfig IE, a fullConfigMCG IE, or a fullConfigSCG IE). If so, at block 1108, the UE uses configuration information from the message to access the target cells. If the message does not include a fullConfig IE (thereby indicating delta signaling), at block 1110 the UE obtains at least a portion of the configuration information needed for accessing the target cells from the configuration that the UE used for accessing the source cell. Other information could be obtained from the message as well in some examples. Once the UE obtains the configuration information needed to access the target cells, the UE performs a random access directed to the target cells. In this case, e.g., the target master cell group and the secondary cell group are associated with 3GPP NG-RAN nodes, one of which may have been associated with the source secondary cell group (thereby facilitating reuse of configuration information that was used for accessing the source secondary cell group during EN-DC). Upon completion of the handover, the UE is in NR-DC at block 1112.

Figure 12:
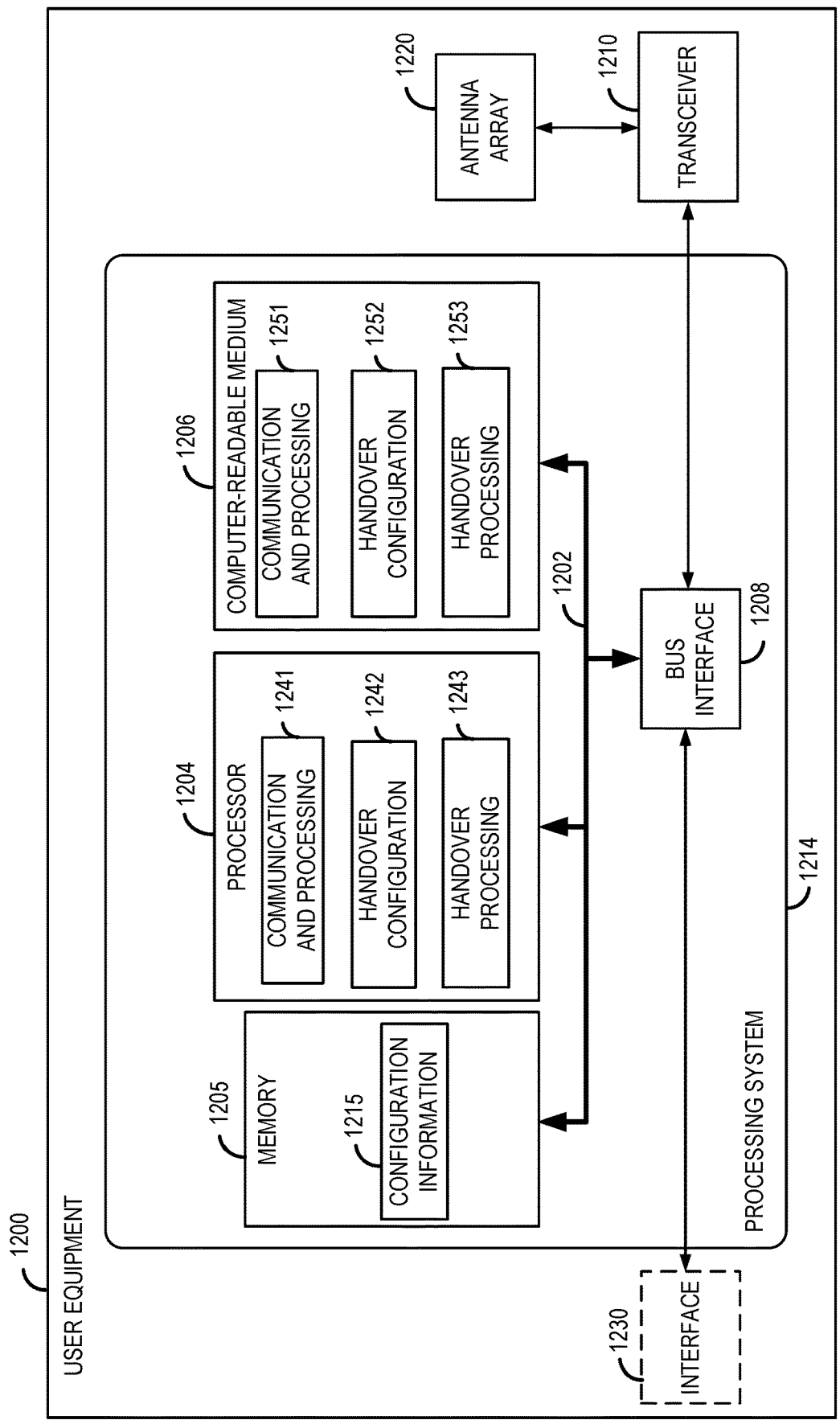
FIG. 12 is a block diagram illustrating an example of a hardware implementation for a user equipment employing a processing system according to some aspects.

FIG. 12 is a block diagram illustrating an example of a hardware implementation for a UE 1200 employing a processing system 1214. For example, the UE 1200 may be a device configured to wirelessly communicate with a base station, as discussed in any one or more of FIGS. 1-11. In some implementations, the UE 1200 may correspond to any of the UEs or scheduled entities shown in any of FIGS. 1, 2, 4, 5, 6, 7, 18, and 19.

In accordance with various aspects of the disclosure, an element, or any portion of an element, or any combination of elements may be implemented with the processing system 1214. The processing system 1214 may include one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1200 may be configured to perform any one or more of the functions described herein. That is, the processor 1204, as utilized in a UE 1200, may be used to implement any one or more of the processes and procedures described herein.

The processor 1204 may in some instances be implemented via a baseband or modem chip and in other implementations, the processor 1204 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210 and between the bus 1202 and an interface 1230. The transceiver 1210 provides a communication interface or means for communicating with various other apparatus over a wireless transmission medium. In some examples, the UE may include two or more transceivers 1210, each configured to communicate with a respective network type (e.g., terrestrial or non-terrestrial). The interface 1230 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1230 may include a user interface (e.g., keypad, display, speaker, microphone, joystick). Of course, such a user interface is optional, and may be omitted in some examples, such as an IoT device.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software. For example, the memory 1205 may store configuration information 1215 (e.g., handover configuration information) used by the processor 1204 to control the handover of the UE 1200.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206.

The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1200 may be configured to perform any one or more of the operations described herein (e.g., as described above in conjunction with FIGS. 1-11 and as described below in conjunction with FIGS. 13-14). In some aspects of the disclosure, the processor 1204, as utilized in the UE 1200, may include circuitry configured for various functions.

The processor 1204 may include communication and processing circuitry 1241. The communication and processing circuitry 1241 may be configured to communicate with a base station, such as a gNB. The communication and processing circuitry 1241 may include one or more hardware components that provide the physical structure that performs various processes related to wireless communication (e.g., signal reception and/or signal transmission) as described herein. The communication and processing circuitry 1241 may further include one or more hardware components that provide the physical structure that performs various processes related to signal processing (e.g., processing a received signal and/or processing a signal for transmission) as described herein. In some examples, the communication and processing circuitry 1241 may include two or more transmit/receive chains, each configured to process signals in a different RAT (or RAN) type. The communication and processing circuitry 1241 may further be configured to execute communication and processing software 1251 included on the computer-readable medium 1206 to implement one or more functions described herein.

In some examples, the communication and processing circuitry 1241 may be configured to receive and process downlink beamformed signals at a mmWave frequency or a sub-6 GHz frequency via the transceiver 1210 and an antenna array 1220. For example, the communication and processing circuitry 1241 may be configured to receive a respective reference signal (e.g., SSB or CSI-RS) on each of a plurality of downlink beams from the base station during a downlink beam sweep via at least one first antenna panel of the antenna array 1220. The communication and processing circuitry 1241 may further be configured to transmit a beam measurement report to the base station.

In some examples, the communication and processing circuitry 1241 may further be configured to generate and transmit uplink beamformed signals at a mmWave frequency or a sub-6 GHz frequency via the transceiver 1210 and the antenna array 1220. For example, the communication and processing circuitry 1241 may be configured to transmit a respective reference signal (e.g., SRS or DMRS) on each of a plurality of uplink beams to the base station during an uplink beam sweep via at least one second antenna panel of the antenna array 1220.

The communication and processing circuitry 1241 may further be configured to generate and transmit a request to the base station. For example, the request may be included in a MAC-CE carried in a PUSCH, UCI in a PUCCH or PUSCH, a random access message, or an RRC message. The communication and processing circuitry 1241 may further be configured to generate and transmit a scheduling request (e.g., via UCI in a PUCCH) to the base station to receive an uplink grant for a PUSCH.

The communication and processing circuitry 1241 may further be configured to generate and transmit an uplink signal on one or more uplink transmit beams applied to the uplink signal. The uplink signal may include, for example, a PUCCH, PUSCH, SRS, DMRS, or PRACH.

The communication and processing circuitry 1241 may further be configured to control the antenna array 1220 and the transceiver 1210 to search for and identify a plurality of downlink transmit beams during a downlink beam sweep. The communication and processing circuitry 1241 may further be configured to obtain a plurality of beam measurements on each of a plurality of downlink receive beams via the antenna array 1220 for each of the identified downlink transmit beams. The communication and processing circuitry 1241 may further be configured to generate a beam measurement report for transmission to the base station using the transceiver 1210.

The communication and processing circuitry 1241 may further be configured to identify one or more selected uplink beam(s) based on the beam measurements obtained from the downlink beam reference signals. In some examples, the communication and processing circuitry 1241 may be configured to compare the respective reference signal received power (RSRP) or other beam measurement measured on each of the downlink receive beams for each of the serving downlink transmit beams to identify the serving downlink receive beams and to further utilize the serving downlink receive beams as the selected uplink transmit beams. Each serving downlink receive beam may have the highest measured RSRP (or other beam measurement) for one of the downlink transmit beams.

The communication and processing circuitry 1241 may be configured to generate one or more uplink transmit beams for transmission in an uplink beam sweep. Each uplink transmit beam may carry an uplink reference signal (e.g., an SRS) for measurement by the base station. The communication and processing circuitry 1241 may further be configured to identify the selected uplink transmit beam(s) selected by the base station based on the uplink beam measurements. For example, the communication and processing circuitry 1241 may be configured to receive an indication of the selected uplink transmit beam(s) from the base station.

In some implementations where the communication involves receiving information, the communication and processing circuitry 1241 may obtain information from a component of the UE 1200 (e.g., from the transceiver 1210 that receives the information via radio frequency signaling or some other type of signaling suitable for the applicable communication medium), process (e.g., decode) the information, and output the processed information. For example, the communication and processing circuitry 1241 may output the information to another component of the processor 1204, to the memory 1205, or to the bus interface 1208. In some examples, the communication and processing circuitry 1241 may receive one or more of signals, messages, other information, or any combination thereof. In some examples, the communication and processing circuitry 1241 may receive information via one or more channels. In some examples, the communication and processing circuitry 1241 may include functionality for a means for receiving. In some examples, the communication and processing circuitry 1241 may include functionality for a means for decoding.

In some implementations where the communication involves sending (e.g., transmitting) information, the communication and processing circuitry 1241 may obtain information (e.g., from another component of the processor 1204, the memory 1205, or the bus interface 1208), process (e.g., encode) the information, and output the processed information. For example, the communication and processing circuitry 1241 may output the information to the transceiver 1210 (e.g., that transmits the information via radio frequency signaling or some other type of signaling suitable for the applicable communication medium). In some examples, the communication and processing circuitry 1241 may send one or more of signals, messages, other information, or any combination thereof. In some examples, the communication and processing circuitry 1241 may send information via one or more channels. In some examples, the communication and processing circuitry 1241 may include functionality for a means for sending (e.g., a means for transmitting). In some examples, the communication and processing circuitry 1241 may include functionality for a means for encoding.

Figure 13:
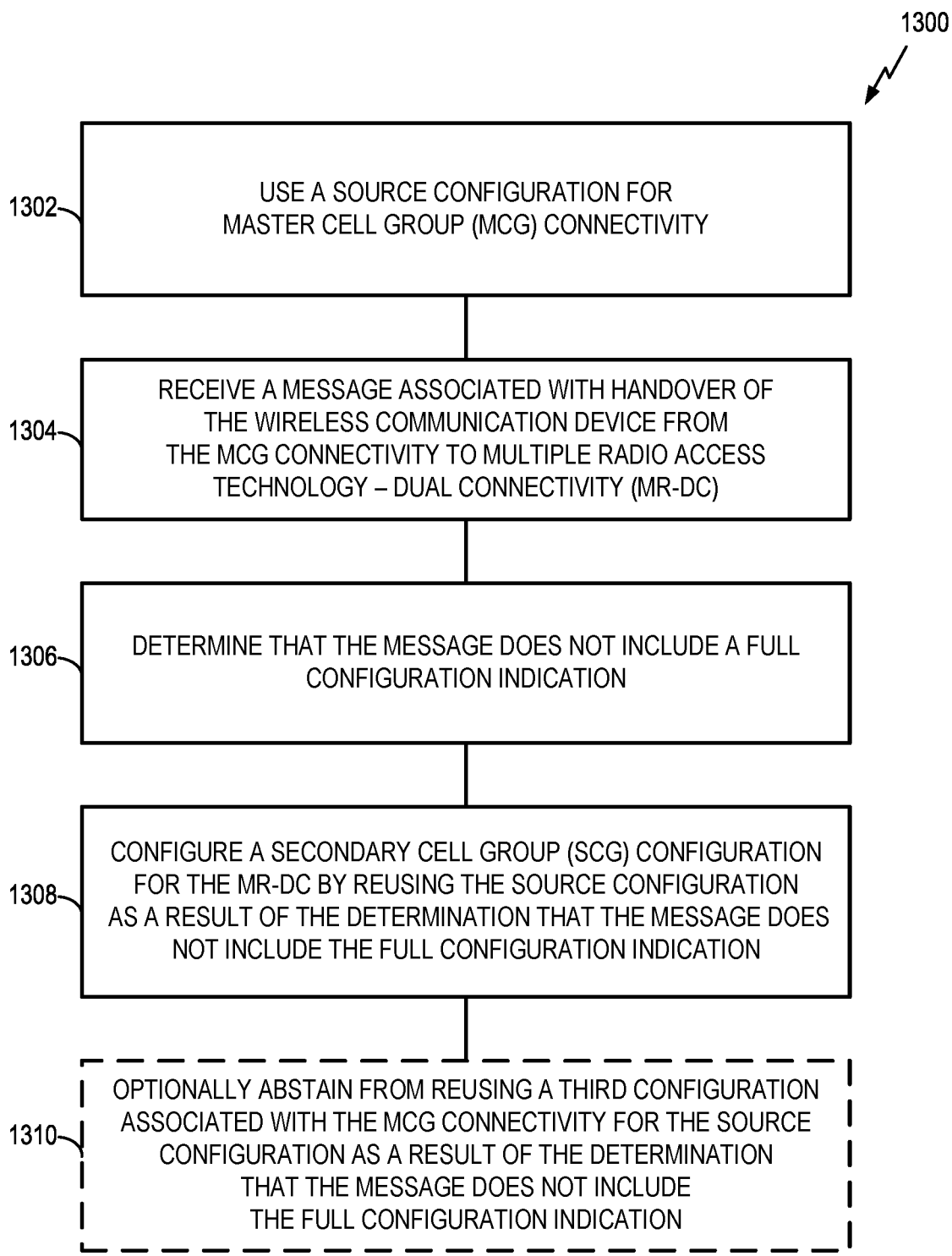
FIG. 13 is a flowchart illustrating an example of a handover process using delta signaling for handover according to some aspects.

The communication and processing circuitry 1241 may include functionality for a means for using a source configuration (e.g., as described in conjunction with the FIG. 7 and/or block 802 of FIG. 8 and/or block 902 of FIG. 9 and/or block 1002 of FIG. 10 and/or block 1102 of FIG. 11 and/or block 1302 of FIG. 13).

The processor 1204 may include handover configuration circuitry 1242 configured to perform handover configuration-related operations as discussed herein (e.g., one or more of the operations described in conjunction with FIGS. 4-11). The handover configuration circuitry 1242 may include functionality for a means for receiving a message associated with handover (e.g., as described in conjunction with the FIG. 7 and/or block 804 of FIG. 8 and/or block 904 of FIG. 9 and/or block 1004 of FIG. 10 and/or block 1104 of FIG. 11 and/or block 1304 of FIG. 13 and/or block 1402 of FIG. 14). The handover configuration circuitry 1242 may further be configured to execute handover configuration software 1252 included on the computer-readable medium 1206 to implement one or more functions described herein.

The processor 1204 may include handover processing circuitry 1243 configured to perform handover processing-related operations as discussed herein (e.g., one or more of the operations described in conjunction with FIGS. 4-11). The handover processing circuitry 1243 may include functionality for a means for determining that the message does not include a full configuration indication (e.g., as described in conjunction with the FIG. 7 and/or block 806 of FIG. 8 and/or block 906 of FIG. 9 and/or block 1006 of FIG. 10 and/or block 1106 of FIG. 11 and/or block 1306 of FIG. 13 and/or block 1404 of FIG. 14). The handover processing circuitry 1243 may include functionality for a means for determining that the message indicates that the wireless communication device is to reuse a configuration (e.g., as described in conjunction with the FIG. 7 and/or block 806 of FIG. 8 and/or block 906 of FIG. 9 and/or block 1006 of FIG. 10 and/or block 1106 of FIG. 11 and/or block 1306 of FIG. 13 and/or block 1404 of FIG. 14). The handover processing circuitry 1243 may include functionality for a means for configuring a secondary cell group (SCG) configuration (e.g., as described in conjunction with the FIG. 7 and/or block 810 of FIG. 8 and/or block 910 of FIG. 9 and/or block 1010 of FIG. 10 and/or block 1110 of FIG. 11 and/or block 1308 of FIG. 13 and/or block 1406 of FIG. 14). The handover processing circuitry 1243 may include functionality for a means for obtaining a configuration (e.g., as described in conjunction with the FIG. 7 and/or block 810 of FIG. 8 and/or block 910 of FIG. 9 and/or block 1010 of FIG. 10 and/or block 1110 of FIG. 11 and/or block 1308 of FIG. 13 and/or block 1406 of FIG. 14). The handover processing circuitry 1243 may include functionality for a means for abstaining from reusing a configuration (e.g., as described in conjunction with the FIG. 7 and/or block 810 of FIG. 8 and/or block 910 of FIG. 9 and/or block 1010 of FIG. 10 and/or block 1110 of FIG. 11 and/or block 1310 of FIG. 13 and/or block 1408 of FIG. 14). The handover processing circuitry 1243 may further be configured to execute handover processing software 1253 included on the computer-readable medium 1206 to implement one or more functions described herein.

FIG. 13 is a flow chart illustrating an example process 1300 for a wireless communication system in accordance with some aspects of the present disclosure. As described below, some or all illustrated features may be omitted in a particular implementation within the scope of the present disclosure, and some illustrated features may not be required for implementation of all examples. In some examples, the process 1300 may be carried out by the UE 1200 illustrated in FIG. 12. In some examples, the process 1300 may be carried out by any suitable apparatus or means for carrying out the functions or algorithm described below.

At block 1302, a wireless communication device (e.g., a UE) uses a source configuration for master cell group (MCG) connectivity (e.g., a standalone (SA) mode). For example, the communication and processing circuitry 1241 and the transceiver 1210, shown and described above in connection with FIG. 12, may establish a connection with an MCG and transmit and receive data via the MCG.

At block 1304, the device receives a message associated with handover of the wireless communication device from the MCG connectivity to multiple radio access technology-dual connectivity (MR-DC) (e.g., handover to a non-stand-alone (NSA) mode). For example, the handover configuration circuitry 1242 together with the communication and processing circuitry 1241 and the transceiver 1210, shown and described above in connection with FIG. 12, may monitor a designated resource (e.g., a PDCCH or a PDSCH) for messages and parse a received message to determine whether the message indicates that the device is to be handed-over.

In some examples, the message may include a radio resource control (RRC) connection reconfiguration message. In some examples, the message indicates whether a full SCG configuration is provided in the message.

In some examples, the MCG connectivity is associated with third generation partnership project (3GPP) new radio (NR) connectivity, and the MR-DC is associated with 3GPP evolved universal terrestrial radio access (E-UTRA)-NR dual connectivity (EN-DC). In some examples, the wireless communication device is served by a third generation partnership project (3GPP) next-generation-radio access network (NG-RAN) node during the MCG connectivity, and the 3GPP NG-RAN node is associated with the SCG for the MR-DC.

At block 1306, the device determines that the message does not include a full configuration indication. For example, the handover configuration circuitry 1242, shown and described above in connection with FIG. 12, may determine that the message indicates that the device is to reuse at least part of a configuration associated with the MCG connectivity for MR-DC. In some examples, the full configuration indication may include a fullConfig information element (fullConfig IE).

At block 1308, the device configures a secondary cell group (SCG) configuration for the MR-DC by reusing the source configuration as a result of the determination that the message does not include the full configuration indication (of block 1306). For example, the handover processing circuitry 1243 together with the communication and processing circuitry 1241 and the transceiver 1210, shown and described above in connection with FIG. 12, may retrieve configuration information for the MCG connectivity stored in memory and apply that configuration information for the MR-DC.

In some examples, the SCG configuration may include at least one of a service data adaptation protocol (SDAP) configuration, a packet data convergence protocol (PDCP) configuration, a physical layer configuration, a medium access control (MAC) layer configuration, a radio link control (RLC) configuration, or any combination thereof.

At optional block 1310, the device may abstain from reusing a third configuration associated with the MCG connectivity for the source configuration as a result of the determination of block 1306. For example, the handover processing circuitry 1243 together with the communication and processing circuitry 1241 and the transceiver 1210, shown and described above in connection with FIG. 12, may determine that some configuration information for the MCG connectivity is not to be used for MR-DC and conduct handover operations accordingly. In some examples, the third configuration may include at least one security configuration.

In some examples, the process 1300 further includes determining that the message may include an nr-Secondary-CellGroupConfig information elements (IE). In some examples, the process 1300 further includes applying a configuration provided in the IE.

In some examples, the wireless communication device may include a user equipment. In some examples, a process in accordance with the teachings herein may include any combination of the above operations.

Figure 14:
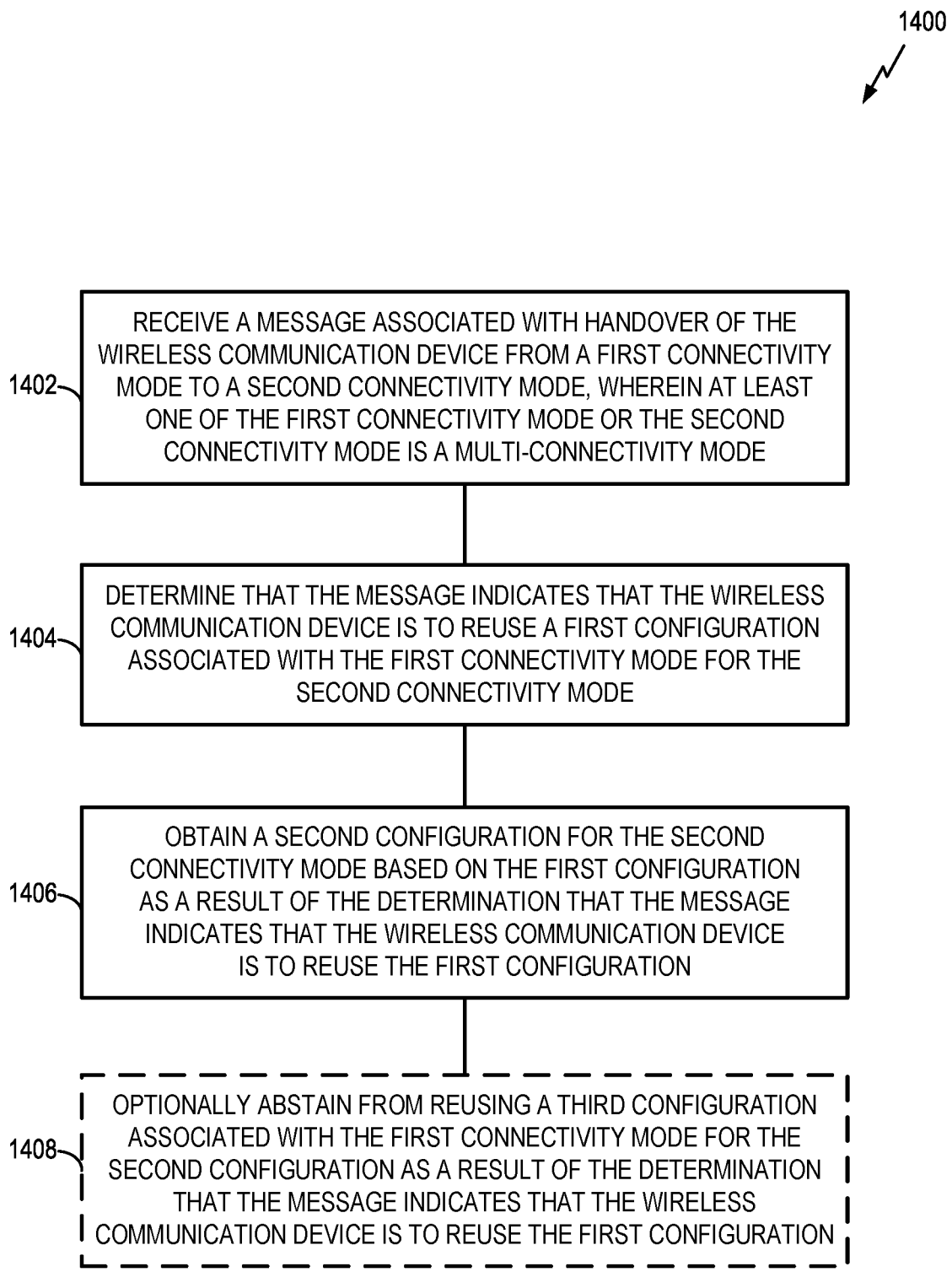
FIG. 14 is a flowchart illustrating an example of a process for delta signaling for multi-connectivity handover according to some aspects.

FIG. 14 is a flow chart illustrating an example process 1400 for a wireless communication system in accordance with some aspects of the present disclosure. As described below, some or all illustrated features may be omitted in a particular implementation within the scope of the present disclosure, and some illustrated features may not be required for implementation of all examples. In some examples, the process 1400 may be carried out by the UE 1200 illustrated in FIG. 12. In some examples, the process 1400 may be carried out by any suitable apparatus or means for carrying out the functions or algorithm described below.

At block 1402, a wireless communication device (e.g., a UE) receives a message associated with handover of the wireless communication device from a first connectivity mode to a second connectivity mode, wherein at least one of the first connectivity mode or the second connectivity mode is a multi-connectivity mode. For example, the handover configuration circuitry 1242 together with the communication and processing circuitry 1241 and the transceiver 1210, shown and described above in connection with FIG. 12, may monitor a designated resource (e.g., a PDCCH or a PDSCH) for messages and parse a received message to determine whether the message indicates that the device is to be handed-over.

In some examples, the message may include a radio resource control (RRC) connection reconfiguration message. In some examples, the message may include a full-Config information element (fullConfig IE). In some examples, the message may include an indication of whether a full master cell group (MCG) configuration is provided in the message. In some examples, the message may include an indication of whether a full secondary cell group (SCG) configuration is provided in the message. In some examples, the multi-connectivity mode may include a dual-connectivity mode or a multi-radio access technology (multi-RAT) dual-connectivity mode.

At block 1404, the device determines that the message indicates that the wireless communication device is to reuse a first configuration associated with the first connectivity mode for the second connectivity mode. For example, the handover configuration circuitry 1242 may determine that the message indicates that the device is to reuse at least part of a configuration associated with the MCG connectivity for MR-DC. In some examples, the handover configuration circuitry 1242 may determine that the message does not include a full configuration indication (e.g., fullConfig IE). In some examples, the first configuration may include a data radio bearer (DRB) configuration.

At block 1406, the device obtains a second configuration for the second connectivity mode based on the first configuration as a result of the determination of block 1404. For example, the handover processing circuitry 1243 may retrieve configuration information for the MCG connectivity stored in memory and apply that configuration information for the MR-DC.

At optional block 1408, the device may abstain from reusing a third configuration associated with the first connectivity mode for the second configuration as a result of the determination that the message indicates that the wireless communication device is to reuse the first configuration (of block 1404). For example, the handover processing circuitry 1243 together with the communication and processing circuitry 1241 and the transceiver 1210, shown and described above in connection with FIG. 12, may determine that some configuration information for the MCG connectivity is not to be used for MR-DC and conduct handover operations accordingly. In some examples, the third configuration may include at least one security configuration.

In some examples, the first connectivity mode may include third generation partnership project (3GPP) new radio (NR) standalone connectivity, and the second connectivity mode may include NR dual connectivity (NR-DC). In some examples, the first configuration may include at least one of a service data adaptation protocol (SDAP) configuration, a packet data convergence protocol (PDCP) configuration, a physical layer configuration, a medium access control (MAC) layer configuration, a radio link control (RLC) configuration, or any combination thereof. In some examples, the wireless communication device is served by a 3GPP next-generation-radio access network (NG-RAN) node during the first connectivity mode, and the 3GPP NG-RAN node is associated with a secondary cell group (SCG) for the second connectivity mode.

In some examples, the first connectivity mode may include third generation partnership project (3GPP) long term evolution (LTE) standalone connectivity, and the second connectivity mode may include LTE dual connectivity (LTE-DC). In some examples, the first configuration may include at least one of a service data adaptation protocol (SDAP) configuration, a packet data convergence protocol (PDCP) configuration, a physical layer configuration, a medium access control (MAC) layer configuration, a radio link control (RLC) configuration, or any combination thereof. In some examples, the wireless communication device is served by a 3GPP evolved universal terrestrial radio access (E-UTRA) node during the first connectivity mode, and the 3GPP E-UTRA node is associated with a secondary cell group (SCG) for the second connectivity mode.

In some examples, the first connectivity mode may include third generation partnership project (3GPP) evolved universal terrestrial radio access (E-UTRA)-NR dual connectivity (EN-DC), and the second connectivity mode may include NR standalone connectivity. In some examples, the first configuration may include at least one of a service data adaptation protocol (SDAP) configuration, a packet data convergence protocol (PDCP) configuration, a physical layer configuration, a medium access control (MAC) layer configuration, a radio link control (RLC) configuration, or any combination thereof. In some examples, a secondary cell group (SCG) for the first connectivity mode may include a 3GPP next-generation-radio access network (NG-RAN) node, and the wireless communication device is served by the 3GPP NG-RAN node during the second connectivity mode.

In some examples, the first connectivity mode may include third generation partnership project (3GPP) 3GPP) evolved universal terrestrial radio access (E-UTRA)-NR dual connectivity (EN-DC), and the second connectivity mode may include NR dual connectivity (NR-DC). In some examples, the first configuration may include at least one of a service data adaptation protocol (SDAP) configuration, a packet data convergence protocol (PDCP) configuration, a physical layer configuration, a medium access control (MAC) layer configuration, a radio link control (RLC) configuration, or any combination thereof. In some examples, a secondary cell group (SCG) for the first connectivity mode may include a 3GPP next-generation-radio access network (NG-RAN) node, and the 3GPP NG-RAN node may include a master cell group (MCG) during the second connectivity mode.

In some examples, the first connectivity mode may include third generation partnership project (3GPP) new radio (NR) connectivity, and the second connectivity mode may include 3GPP evolved universal terrestrial radio access (E-UTRA)-NR dual connectivity (EN-DC). In some examples, the first configuration may include at least one of a service data adaptation protocol (SDAP) configuration, a packet data convergence protocol (PDCP) configuration, a physical layer configuration, a medium access control (MAC) layer configuration, a radio link control (RLC) configuration, or any combination thereof. In some examples, the wireless communication device is served by a 3GPP next-generation-radio access network (NG-RAN) node during the first connectivity mode, and the 3GPP NG-RAN node is associated with a secondary cell group (SCG) during the second connectivity mode.

In some examples, the wireless communication device may include a user equipment. In some examples, a process in accordance with the teachings herein may include any combination of the above operations.

Figure 15:
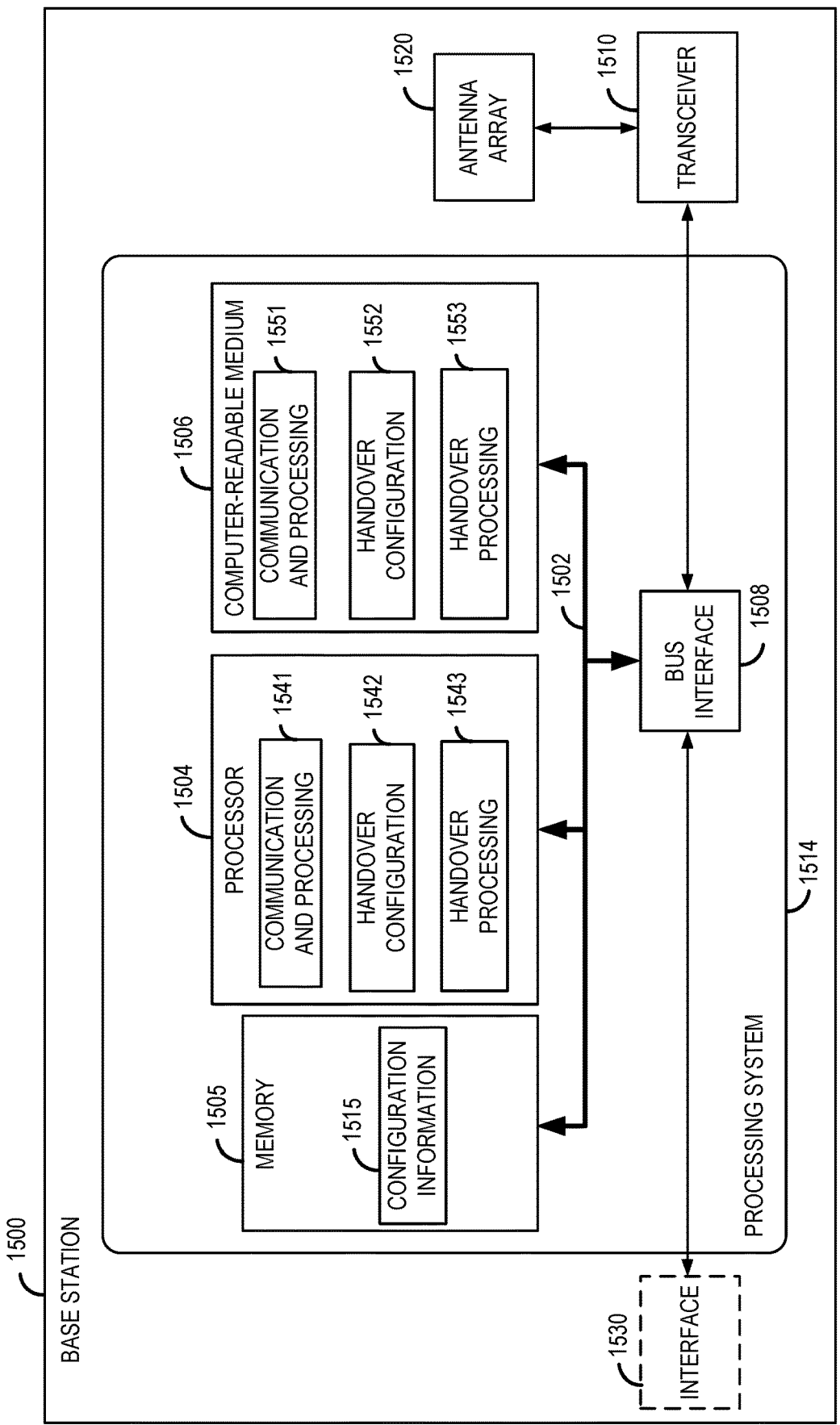
FIG. 15 is a block diagram illustrating an example of a hardware implementation for a base station employing a processing system according to some aspects.

FIG. 15 is a conceptual diagram illustrating an example of a hardware implementation for base station (BS) 1500 employing a processing system 1514. In some implementations, the BS 1500 may correspond to any of the BSs (e.g., gNBs) or scheduling entities shown in any of FIGS. 1, 2, 4, 5, 6, 7, 20, and 21.

In accordance with various aspects of the disclosure, an element, or any portion of an element, or any combination of elements may be implemented with the processing system 1514. The processing system may include one or more processors 1504. The processing system 1514 may be substantially the same as the processing system 1214 illustrated in FIG. 12, including a bus interface 1508, a bus 1502, memory 1505, a processor 1504, and a computer-readable medium 1506. The memory 1505 may store configuration information 1515 (e.g., handover configuration information) used by the processor 1504 to control the handover of a UE. Furthermore, the BS 1500 may include an interface 1530 (e.g., a network interface) that provides a means for communicating with at least one other apparatus within a core network and with at least one other radio access network.

The BS 1500 may be configured to perform any one or more of the operations described herein (e.g., as described above in conjunction with FIGS. 1-11 and as described below in conjunction with FIGS. 16-17). In some aspects of the disclosure, the processor 1504, as utilized in the BS 1500, may include circuitry configured for various functions.

The processor 1504 may be configured to generate, schedule, and modify a resource assignment or grant of time-frequency resources (e.g., a set of one or more resource elements). For example, the processor 1504 may schedule time-frequency resources within a plurality of time division duplex (TDD) and/or frequency division duplex (FDD) subframes, slots, and/or mini-slots to carry user data traffic and/or control information to and/or from multiple UEs.

The processor 1504 may be configured to schedule resources for the transmission of downlink reference signals (e.g., SSBs or CSI-RSs) on a plurality of downlink beams for a downlink beam sweep in accordance with a selected downlink beam sweep type and selected number of downlink reference signal resources indicated in a request for uplink beam refinement received from a UE. The processor 1504 may further be configured to schedule resources for the uplink transmission of uplink reference signals (e.g., SRSs) on a plurality of uplink beams for an uplink beam sweep in accordance with a selected beam sweep type and selected number of uplink reference signal resources indicated in the request. The processor 1504 may further be configured to schedule resources that may be utilized by the UE to transmit the request. For example, the uplink beam refinement request resources may include resources scheduled for transmission of a PUCCH, PUSCH, PRACH occasion or RRC message. In some examples, the processor 1504 may be configured to schedule PUSCH resources for the uplink beam refinement request in response to receiving a scheduling request from the UE.

The processor 1504 may further be configured to schedule resources for the transmission of an uplink signal. In some examples, the resources may be associated with one or more uplink transmit beams and one or more corresponding receive beams applied to the uplink signal (e.g., based on the uplink BPLs) based on an indication of the uplink signal associated with the one or more uplink transmit beams included in the request. In some examples, the resources may be associated with an uplink transmission scheme indicating a number of uplink transmit beams to be utilized for the uplink signal, a number of repetitions per uplink transmit beam of the uplink signal, and a multiplexing scheme when more than one uplink transmit beam is used to transmit the uplink signal.

In some aspects of the disclosure, the processor 1504 may include communication and processing circuitry 1541. The communication and processing circuitry 1544 may be configured to communicate with a UE. The communication and processing circuitry 1541 may include one or more hardware components that provide the physical structure that performs various processes related to communication (e.g., signal reception and/or signal transmission) as described herein. The communication and processing circuitry 1541 may further include one or more hardware components that provide the physical structure that performs various processes related to signal processing (e.g., processing a received signal and/or processing a signal for transmission) as described herein. The communication and processing circuitry 1541 may further be configured to execute communication and processing software 1551 included on the computer-readable medium 1506 to implement one or more functions described herein.

In some examples, the communication and processing circuitry 1541 may be configured to receive and process uplink beamformed signals at a mmWave frequency or a sub-6 GHz frequency via the transceiver 1510 and an antenna array 1520. For example, the communication and processing circuitry 1541 may be configured to receive a respective reference signal (e.g., SRS or DMRS) on each of a plurality of uplink beams from the UE during an uplink beam sweep.

In some examples, the communication and processing circuitry 1541 may further be configured to generate and transmit downlink beamformed signals at a mmWave frequency or a sub-6 GHz frequency via the transceiver 1510 and the antenna array 1520. For example, the communication and processing circuitry 1541 may be configured to transmit a respective downlink reference signal (e.g., SSB or CSI-RS) on each of a plurality of downlink beams to the UE during a downlink beam sweep via at least one first antenna panel of the antenna array 1520. The communication and processing circuitry 1541 may further be configured to receive a beam measurement report from the UE.

The communication and processing circuitry 1541 may further be configured to receive a request from the UE. For example, the request may be included in a MAC-CE carried in a PUSCH, UCI in a PUCCH or PUSCH, a random access message, or an RRC message. The communication and processing circuitry 1541 may further be configured to receive a scheduling request (e.g., via UCI in a PUCCH) from the UE for an uplink grant for the PUSCH carrying the MAC-CE.

The communication and processing circuitry 1541 may further be configured to receive an uplink signal on one or more uplink receive beams via one or more uplink transmit beams applied to the uplink signal. For example, the communication and processing circuitry 1541 may be configured to receive the uplink signal on one or more uplink receive beams via at least one second antenna panel of the antenna array 1520. The uplink signal may include, for example, a PUCCH, PUSCH, SRS, DMRS, or PRACH.

The communication and processing circuitry 1541 may further be configured to control the antenna array 1520 and transceiver 1510 to generate a plurality of downlink transmit beams during a downlink beam sweep. The communication and processing circuitry 1541 may further be configured to receive a beam measurement report from the UE using the communication and processing circuitry 1544. The communication and processing circuitry 1541 may further be configured to identify one or more selected uplink beam(s) based on the beam measurements. In some examples, the communication and processing circuitry 1541 may be configured to compare the respective RSRP (or other beam measurement) measured on each of the downlink receive beams for each of the serving downlink transmit beams to identify the serving downlink receive beams and to further identify the serving downlink receive beams as the selected uplink transmit beams. Each serving downlink receive beam may have the highest measured RSRP (or other beam measurement) for one of the downlink transmit beams.

The communication and processing circuitry 1541 may be configured to receive one or more uplink transmit beams in an uplink beam sweep. Each uplink transmit beam may carry an uplink reference signal (e.g., an SRS) for measurement by the communication and processing circuitry 1541. The communication and processing circuitry 1541 may further be configured to obtain a plurality of beam measurements on each of a plurality of uplink receive beams of the antenna array 1520 for each of the uplink transmit beams. The communication and processing circuitry 1541 may further be configured to select the selected uplink transmit beam(s)

and corresponding uplink receive beams forming respective uplink BPLs based on the uplink beam measurements.

In some implementations wherein the communication involves receiving information, the communication and processing circuitry 1541 may obtain information from a component of the BS 1500 (e.g., from the transceiver 1510 that receives the information via radio frequency signaling or some other type of signaling suitable for the applicable communication medium), process (e.g., decode) the information, and output the processed information. For example, the communication and processing circuitry 1541 may output the information to another component of the processor 1504, to the memory 1505, or to the bus interface 1508. In some examples, the communication and processing circuitry 1541 may receive one or more of signals, messages, other information, or any combination thereof. In some examples, the communication and processing circuitry 1541 may receive information via one or more channels. In some examples, the communication and processing circuitry 1541 may include functionality for a means for receiving. In some examples, the communication and processing circuitry 1541 may include functionality for a means for decoding.

In some implementations wherein the communication involves sending (e.g., transmitting) information, the communication and processing circuitry 1541 may obtain information (e.g., from another component of the processor 1504, the memory 1505, or the bus interface 1508), process (e.g., encode) the information, and output the processed information. For example, the communication and processing circuitry 1541 may output the information to the transceiver 1510 (e.g., that transmits the information via radio frequency signaling or some other type of signaling suitable for the applicable communication medium). In some examples, the communication and processing circuitry 1541 may send one or more of signals, messages, other information, or any combination thereof. In some examples, the communication and processing circuitry 1541 may send information via one or more channels. In some examples, the communication and processing circuitry 1541 may include functionality for a means for sending (e.g., a means for transmitting). In some examples, the communication and processing circuitry 1541 may include functionality for a means for encoding.

The processor 1504 may include handover configuration circuitry 1542 configured to perform handover configuration-related operations as discussed herein (e.g., one or more of the operations described in conjunction with FIGS. 4-11). The handover configuration circuitry 1542 may include functionality for a means for generating a message that indicates whether delta signaling is applicable (e.g., as described in conjunction with the FIG. 7 and/or block 804 of FIG. 8 and/or block 904 of FIG. 9 and/or block 1004 of FIG. 10 and/or block 1104 of FIG. 11 and/or block 1604 of FIG. 16 and/or block 1704 of FIG. 17). The handover configuration circuitry 1542 may include functionality for a means for sending a message (e.g., as described in conjunction with the FIG. 7 and/or block 804 of FIG. 8 and/or block 904 of FIG. 9 and/or block 1004 of FIG. 10 and/or block 1104 of FIG. 11 and/or block 1606 of FIG. 16 and/or block 1706 of FIG. 17). The handover configuration circuitry 1542 may further be configured to execute handover configuration software 1552 included on the computer-readable medium 1506 to implement one or more functions described herein.

The processor 1504 may include handover processing circuitry 1543 configured to perform handover processing-related operations as discussed herein (e.g., one or more of the operations described in conjunction with FIGS. 4-11). The handover processing circuitry 1543 may include functionality for a means for determining that a UE is to be handed-over (e.g., as described in conjunction with the FIG. 7 and/or block 804 of FIG. 8 and/or block 904 of FIG. 9 and/or block 1004 of FIG. 10 and/or block 1104 of FIG. 11 and/or block 1602 of FIG. 16 and/or block 1702 of FIG. 17). The handover processing circuitry 1543 may further be configured to execute handover processing software 1553 included on the computer-readable medium 1506 to implement one or more functions described herein.

Figure 16:
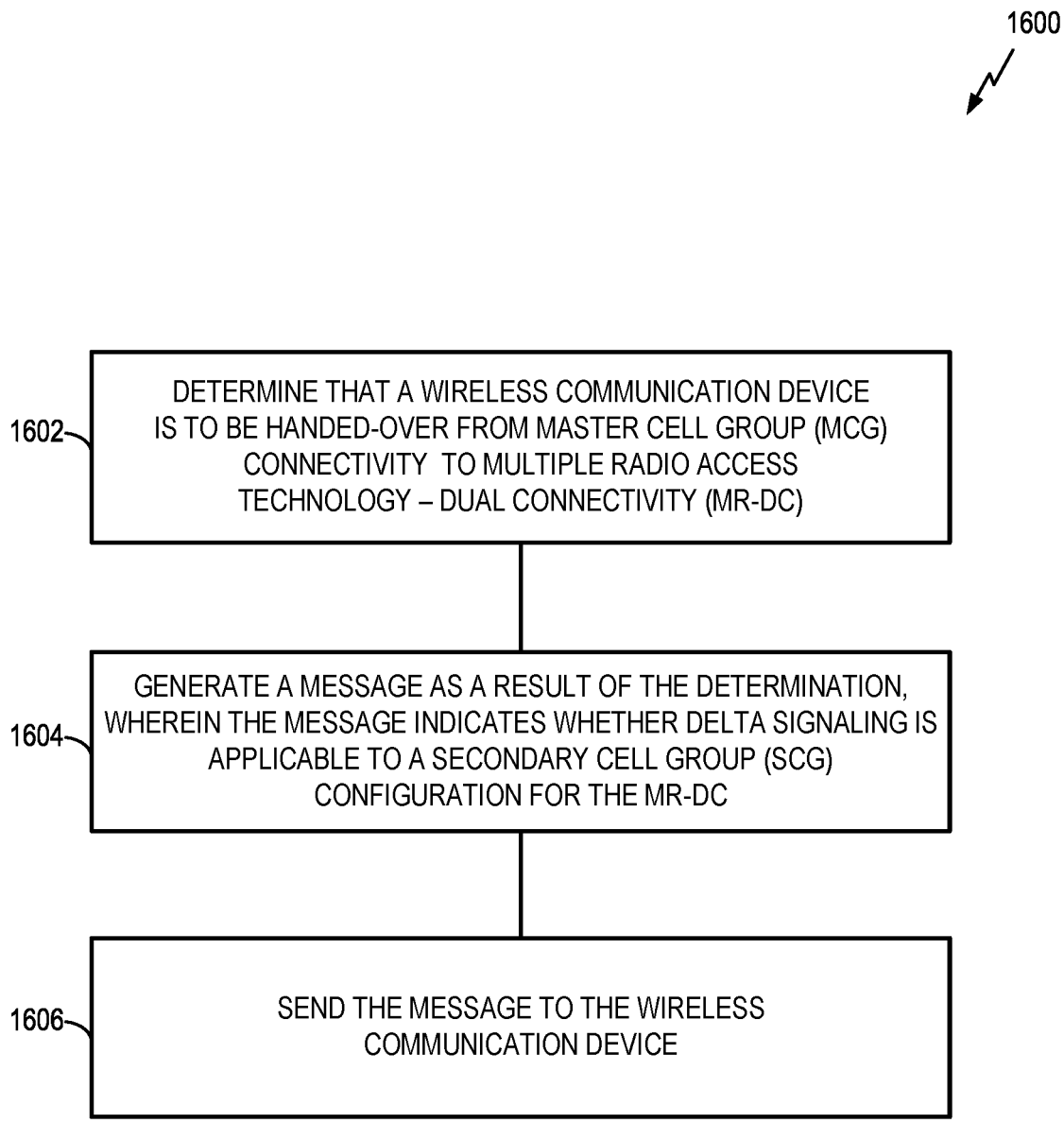
FIG. 16 is a flowchart illustrating an example of a handover process using delta signaling according to some aspects.

FIG. 16 is a flow chart illustrating an example process 1600 for wireless communication in accordance with some aspects of the present disclosure. As described below, some or all illustrated features may be omitted in a particular implementation within the scope of the present disclosure, and some illustrated features may not be required for implementation of all examples. In some examples, the process 1600 may be carried out by the BS 1500 illustrated in FIG. 15. In some examples, the process 1600 may be carried out by any suitable apparatus or means for carrying out the functions or algorithm described below.

At block 1602, a device (e.g., a BS) determines that a wireless communication device is to be handed-over from master cell group connectivity (e.g., a standalone (SA) mode) to multiple radio access technology-dual connectivity (MR-DC) (e.g., handover to a non-standalone (NSA) mode). For example, the handover processing circuitry 1543 together with the communication and processing circuitry 1541 and the transceiver 1510, shown and described above in connection with FIG. 15, may determine that a UE needs to access service (e.g., VoIP) that is not provided by the MCG connectivity.

In some examples, the MCG connectivity is associated with third generation partnership project (3GPP) new radio (NR) connectivity, and the MR-DC is associated with 3GPP evolved universal terrestrial radio access (E-UTRA)-NR dual connectivity (EN-DC). In some examples, the wireless communication device is served by a third generation partnership project (3GPP) next-generation-radio access network (NG-RAN) node during the MCG connectivity, and the 3GPP NG-RAN node is associated with the SCG for the MR-DC.

At block 1604, the device generates a message as a result of the determination of block 1602. The message indicates whether delta signaling is applicable to a secondary cell group (SCG) configuration for the MR-DC. For example, the handover configuration circuitry 1542, shown and described above in connection with FIG. 15, may generate a message that indicates that the device is to reuse a first configuration associated with the MCG connectivity for the MR-DC. In some examples, the handover configuration circuitry 1242 may generate a message that does not include a fullConfig IE.

In some examples, the delta signaling relates to the wireless communication device reusing a source configuration associated with the MCG connectivity for the SCG configuration for the MR-DC. For example, the delta signaling may notify the wireless communication device to reuse a source configuration associated with the MCG connectivity for the SCG configuration for the MR-DC.

In some examples, the source configuration may include at least one of a service data adaptation protocol configuration (e.g., SDAP configurations of DRBs), a packet data convergence protocol configuration (e.g., PDCP configurations of DRBs), a physical layer configuration, a medium access control (MAC) layer configuration, a radio link control configuration (e.g., RLC configurations of DRBs), or any combination thereof.

In some examples, the delta signaling further relates to the wireless communication device abstaining from reusing a third configuration associated with the MCG connectivity for the SCG configuration for the MR-DC. For example, the delta signaling may notify the wireless communication device to abstain from reusing a third configuration associated with the MCG connectivity for the SCG configuration for the MR-DC. In some examples, the third configuration may include at least one security configuration.

At block 1606, the device sends the message to the wireless communication device. For example, the handover configuration circuitry 1542 together with the communication and processing circuitry 1541 and the transceiver 1510, shown and described above in connection with FIG. 15, may encode and transmit the message on a designated resource (e.g., an PDCCH or PDSCH) for a UE.

In some examples, the message may include a radio resource control (RRC) connection reconfiguration message. In some examples, the message may include a full-Config information element (fullConfig IE). In some examples, the message indicates whether a full SCG configuration is provided in the message.

In some examples, the wireless communication device may include a user equipment. In some examples, a process in accordance with the teachings herein may include any combination of the above operations.

Figure 17:
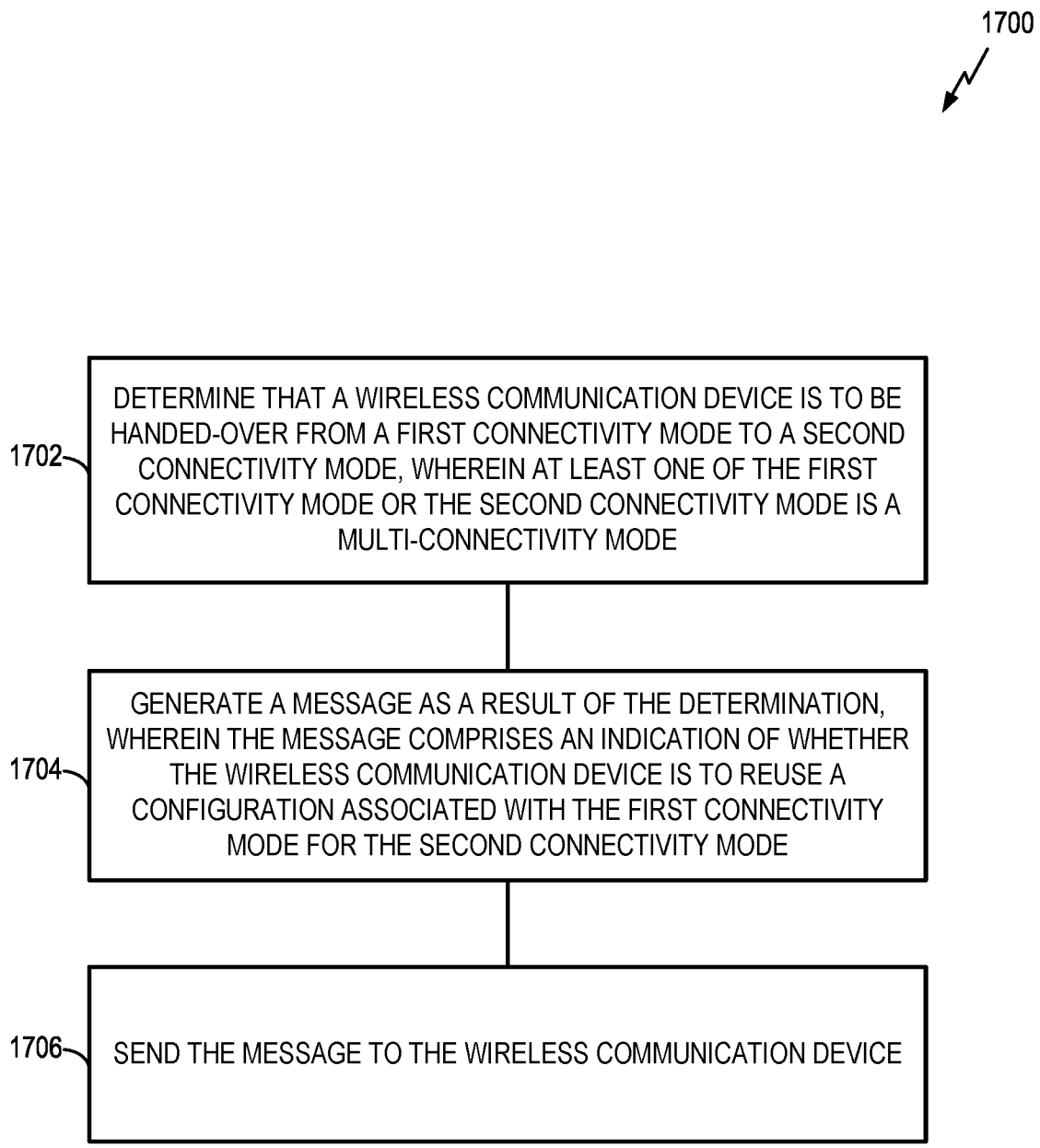
FIG. 17 is a flowchart illustrating an example of a process for delta signaling for multi-connectivity handover according to some aspects.

FIG. 17 is a flow chart illustrating an example process 1700 for wireless communication in accordance with some aspects of the present disclosure. As described below, some or all illustrated features may be omitted in a particular implementation within the scope of the present disclosure, and some illustrated features may not be required for implementation of all examples. In some examples, the process 1700 may be carried out by the BS 1500 illustrated in FIG. 15. In some examples, the process 1700 may be carried out by any suitable apparatus or means for carrying out the functions or algorithm described below.

At block 1702, a device (e.g., a BS) determines that a wireless communication device is to be handed-over from a first connectivity mode to a second connectivity mode, wherein at least one of the first connectivity mode or the second connectivity mode is a multi-connectivity mode. For example, the handover processing circuitry 1543 together with the communication and processing circuitry 1541 and the transceiver 1510, shown and described above in connection with FIG. 15, may determine that a UE needs to access service (e.g., VoIP) that is not provided by the MCG connectivity.

In some examples, the multi-connectivity mode may include a dual-connectivity mode or a multi-radio access technology (multi-RAT) dual-connectivity mode.

At block 1704, the device generates a message as a result of the determination of block 1702. The message may include an indication of whether the wireless communication device is to reuse a configuration associated with the first connectivity mode for the second connectivity mode. For example, the handover configuration circuitry 1542, shown and described above in connection with FIG. 15, may generate a message that indicates that the device is to reuse a first configuration associated with the first connectivity mode for the second connectivity mode. For example, the handover configuration circuitry 1242 may generate the message to indicate that the device is to reuse at least part of a configuration associated with the MCG connectivity for MR-DC.

In some examples, the message may include a radio resource control (RRC) connection reconfiguration message. In some examples, the indication may include a fullConfig information element (IE). In some examples, the configuration may include a data radio bearer (DRB) configuration.

In some examples, the indication further indicates that the wireless communication device is to abstain from reusing a third configuration associated with the first connectivity mode for the second connectivity mode. In some examples, the third configuration may include at least one security configuration.

In some examples, the indication indicates whether a full master cell group (MCG) configuration is provided in the message. In some examples, the indication indicates whether a full secondary cell group (SCG) configuration is provided in the message.

At block 1706, the device sends the message to the wireless communication device. For example, the handover configuration circuitry 1542 together with the communication and processing circuitry 1541 and the transceiver 1510, shown and described above in connection with FIG. 15, may encode and transmit the message on a designated resource (e.g., an PDCCH or PDSCH) for a UE.

In some examples, the first connectivity mode may include third generation partnership project (3GPP) new radio (NR) standalone connectivity, and the second connectivity mode may include NR dual connectivity (NR-DC). In some examples, the configuration may include at least one of a service data adaptation protocol (SDAP) configuration, a packet data convergence protocol (PDCP) configuration, a physical layer configuration, a medium access control (MAC) layer configuration, a radio link control (RLC) configuration, or any combination thereof. In some examples, the wireless communication device is served by a 3GPP next-generation-radio access network (NG-RAN) node during the first connectivity mode, and the 3GPP NG-RAN node is associated with a secondary cell group (SCG) for the second connectivity mode.

In some examples, the first connectivity mode may include third generation partnership project (3GPP) long term evolution (LTE) standalone connectivity, and the second connectivity mode may include LTE dual connectivity (LTE-DC). In some examples, the configuration may include at least one of a service data adaptation protocol (SDAP) configuration, a packet data convergence protocol (PDCP) configuration, a physical layer configuration, a medium access control (MAC) layer configuration, a radio link control (RLC) configuration, or any combination thereof. In some examples, the wireless communication device is served by a 3GPP evolved universal terrestrial radio access (E-UTRA) node during the first connectivity mode, and the 3GPP E-UTRA node is associated with a secondary cell group (SCG) for the second connectivity mode.

In some examples, the first connectivity mode may include third generation partnership project (3GPP) evolved universal terrestrial radio access (E-UTRA)-NR dual connectivity (EN-DC), and the second connectivity mode may include NR standalone connectivity. In some examples, the configuration may include at least one of a service data adaptation protocol (SDAP) configuration, a packet data convergence protocol (PDCP) configuration, a physical layer configuration, a medium access control (MAC) layer configuration, a radio link control (RLC) configuration, or any combination thereof. In some examples, a secondary cell group (SCG) for the first connectivity mode may include a 3GPP next-generation-radio access network (NG-RAN)

node, and the wireless communication device is served by the 3GPP NG-RAN node during the second connectivity mode.

In some examples, the first connectivity mode may include third generation partnership project (3GPP) 3GPP evolved universal terrestrial radio access (E-UTRA)-NR dual connectivity (EN-DC), and the second connectivity mode may include NR dual connectivity (NR-DC). In some examples, the configuration may include at least one of a service data adaptation protocol (SDAP) configuration, a packet data convergence protocol (PDCP) configuration, a physical layer configuration, a medium access control (MAC) layer configuration, a radio link control (RLC) configuration, or any combination thereof. In some examples, a secondary cell group (SCG) for the first connectivity mode may include a 3GPP next-generation-radio access network (NG-RAN) node, and the 3GPP NG-RAN node may include a master cell group (MCG) during the second connectivity mode.

In some examples, the first connectivity mode may include third generation partnership project (3GPP) new radio (NR) connectivity, and the second connectivity mode may include 3GPP evolved universal terrestrial radio access (E-UTRA)-NR dual connectivity (EN-DC). In some examples, the configuration may include at least one of a service data adaptation protocol (SDAP) configuration, a packet data convergence protocol (PDCP) configuration, a physical layer configuration, a medium access control (MAC) layer configuration, a radio link control (RLC) configuration, or any combination thereof. In some examples, the wireless communication device is served by a 3GPP next-generation-radio access network (NG-RAN) node during the first connectivity mode, and the 3GPP NG-RAN node is associated with a secondary cell group (SCG) during the second connectivity mode.

In some examples, the wireless communication device may include a user equipment. In some examples, a process in accordance with the teachings herein may include any combination of the above operations.

Figure 18:
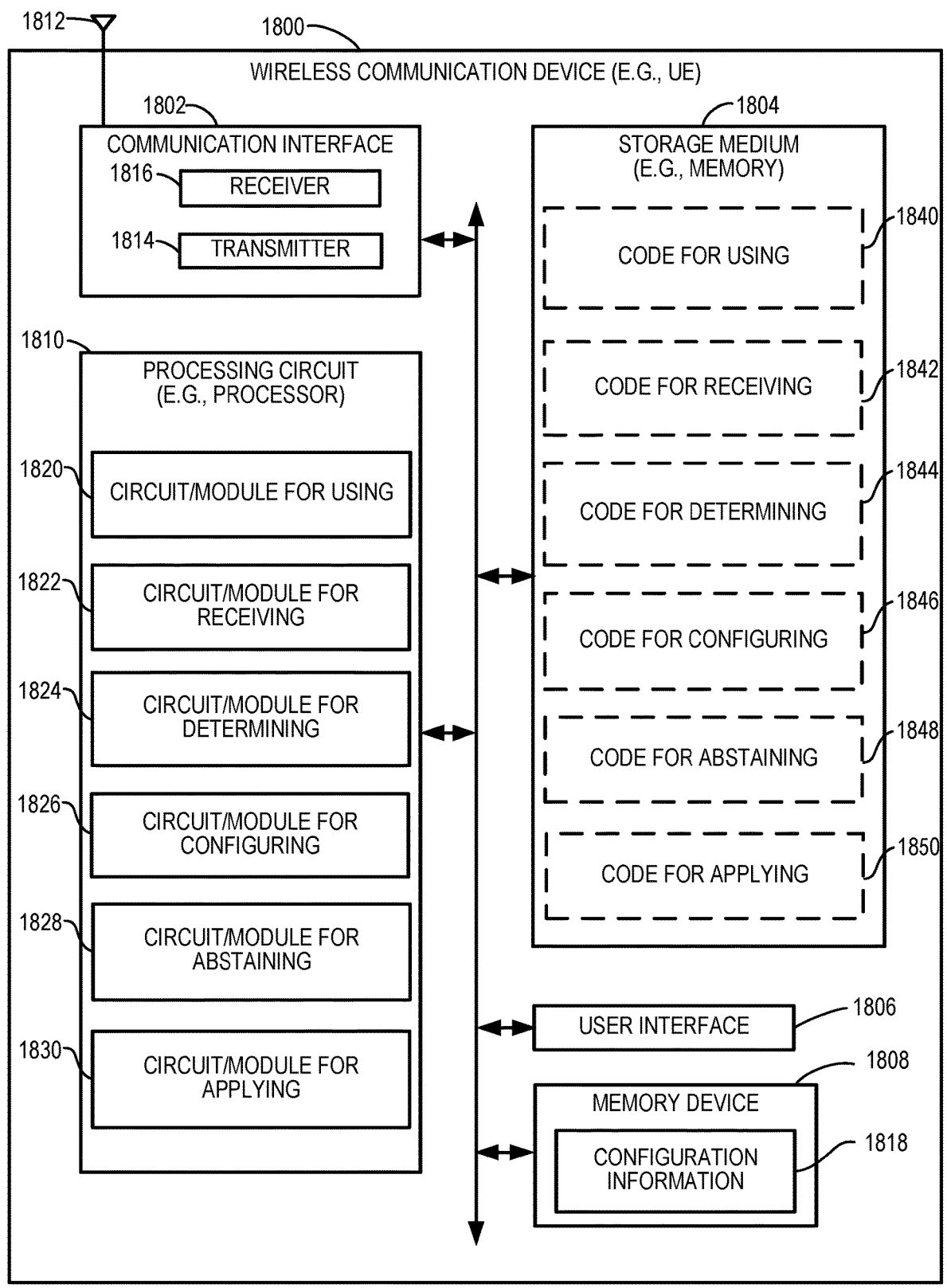
FIG. 18 is a block diagram conceptually illustrating an example hardware implementation of a device for wireless communication (e.g., a UE) according to some aspects.

FIG. 18 illustrates a block diagram of an example hardware implementation of a wireless communication device 1800 configured to communicate according to some aspects. The device 1800 could embody or be implemented within a UE, a wireless communication device, a base station (BS), a gNB, a transmit receive point (TRP), an eNode B (eNB), a CPE, or some other type of device that supports wireless communication. In various implementations, the device 1800 could embody or be implemented within an access terminal, an access point, or some other type of device. In various implementations, the device 1800 could embody or be implemented within a server, a personal computer, a mobile phone, a smart phone, a tablet, a portable computer, a sensor, an alarm, a vehicle, a machine, an entertainment device, a medical device, or any other electronic device having circuitry. The device 1800 may correspond at least in some aspect to, for example, any of the UEs or scheduled entities shown in any of FIGS. 1, 2, 4, 5, 6, 7, 12, and 19.

The device 1800 includes a communication interface 1802 (e.g., at least one transceiver), a storage medium 1804, a user interface 1806, a memory device 1808 (e.g., storing configuration information 1818), and a processing circuit 1810 (e.g., at least one processor). In various implementations, the user interface 1806 may include one or more of a keypad, a display, a speaker, a microphone, a touchscreen display, of some other circuitry for receiving an input from or sending an output to a user. The communication interface 1802 may be coupled to one or more antennas 1812, and may include a transmitter 1814 and a receiver 1816. In general, the components of FIG. 18 may be similar to corresponding components of the UE 1200 of FIG. 12.

The processing circuit 1810 may be adapted to perform any or all of the features, processes, functions, operations and/or routines for any or all of the devices described herein. For example, the processing circuit 1810 may be configured to perform any of the steps, functions, and/or processes described with respect to FIGS. 1-11 and 13. As used herein, the term "adapted" in relation to the processing circuit 1810 may refer to the processing circuit 1810 being one or more of configured, used, implemented, and/or programmed to perform a particular process, function, operation and/or routine according to various features described herein.

The processing circuit 1810 may be a specialized processor, such as an application specific integrated circuit (ASIC) that serves as a means for (e.g., structure for) carrying out any one of the operations described in conjunction with FIGS. 1-11 and 13. The processing circuit 1810 may serve as one example of a means for transmitting and/or a means for receiving. In various implementations, the processing circuit 1810 may provide and/or incorporate, at least in part, the functionality described above for the second device 704 (e.g., the communication controller 710) of FIG. 7.

According to at least one example of the device 1800, the processing circuit 1810 may include one or more of a circuit/module for using 1820, a circuit/module for receiving 1822, a circuit/module for determining 1824, a circuit/module for configuring 1826, a circuit/module for abstaining 1828, or a circuit/module for applying 1830. In various implementations, the circuit/module for using 1820, the circuit/module for receiving 1822, the circuit/module for determining 1824, the circuit/module for configuring 1826, the circuit/module for abstaining 1828, or the circuit/module for applying 1830 may provide and/or incorporate, at least in part, the functionality described above for the second device 704 (e.g., the communication controller 710) of FIG. 7.

As mentioned above, programming stored by the storage medium 1804, when executed by the processing circuit 1810, causes the processing circuit 1810 to perform one or more of the various functions and/or process operations described herein. For example, the programming may cause the processing circuit 1810 to perform the various functions, steps, and/or processes described herein with respect to FIGS. 1-11 and 13 in various implementations. As shown in FIG. 18, the storage medium 1804 may include one or more of code for using 1840, code for receiving 1842, code for determining 1244, code for configuring 1846, code for abstaining 1848, or code for applying 1850. In various implementations, the code for using 1840, the code for receiving 1842, the code for determining 1844, the code for configuring 1846, the code for abstaining 1848, or the code for applying 1850 may be executed or otherwise used to provide the functionality described herein for the circuit/module for using 1820, the circuit/module for receiving 1822, the circuit/module for determining 1824, the circuit/module for configuring 1826, the circuit/module for abstaining 1828, or the circuit/module for applying 1830.

In some examples, the circuit/module for using 1820 of FIG. 18 (e.g., the communication controller 710 of FIG. 7) performs the operations of block 1302 and/or other similar operations as taught herein. In some examples, the code for using 1840 of FIG. 18 is executed to perform the operations of block 1302 and/or other similar operations as taught herein.

In some examples, the circuit/module for receiving 1822 of FIG. 18 (e.g., the communication controller 710 of FIG. 7 performs the operations of block 1304 and/or other similar operations as taught herein. In some examples, the code for receiving 1842 of FIG. 18 is executed to perform the operations of block 1304 and/or other similar operations as taught herein.

In some examples, the circuit/module for determining 1824 of FIG. 18 (e.g., the handover controller 722 of FIG. 7) performs the operations of block 1306 and/or other similar operations as taught herein. In some examples, the code for determining 1844 of FIG. 18 is executed to perform the operations of block 1306 and/or other similar operations as taught herein.

In some examples, the circuit/module for configuring 1826 of FIG. 18 (e.g., the handover controller 722 of FIG. 7) performs the operations of block 1308 and/or other similar operations as taught herein. In some examples, the code for configuring 1846 of FIG. 18 is executed to perform the operations of block 1308 and/or other similar operations as taught herein.

In some examples, the circuit/module for abstaining 1828 of FIG. 18 (e.g., the handover controller 722 of FIG. 7) performs the operations of block 1310 and/or other similar operations as taught herein. In some examples, the code for abstaining 1848 of FIG. 18 is executed to perform the operations of block 1310 and/or other similar operations as taught herein.

Figure 19:
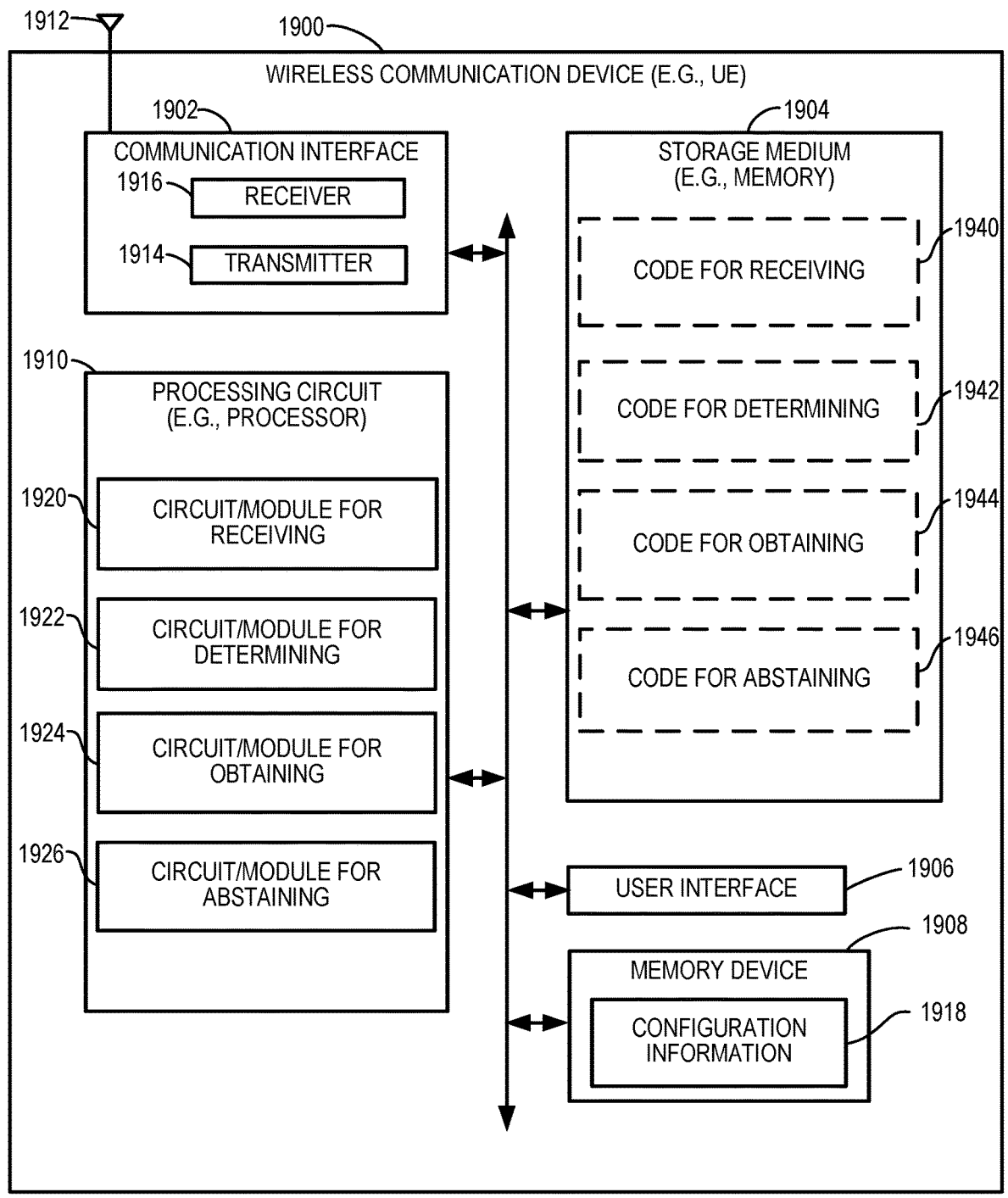
FIG. 19 is a block diagram conceptually illustrating another example hardware implementation of a device for wireless communication (e.g., a UE) according to some aspects.

FIG. 19 illustrates a block diagram of an example hardware implementation of a wireless communication device 1900 configured to communicate according to some aspects. The device 1900 could embody or be implemented within a UE, a wireless communication device, a base station (BS), a gNB, a transmit receive point (TRP), an eNode B (eNB), a CPE, or some other type of device that supports wireless communication. In various implementations, the device 1900 could embody or be implemented within an access terminal, an access point, or some other type of device. In various implementations, the device 1900 could embody or be implemented within a server, a personal computer, a mobile phone, a smart phone, a tablet, a portable computer, a sensor, an alarm, a vehicle, a machine, an entertainment device, a medical device, or any other electronic device having circuitry. The device 1900 may correspond at least in some aspect to, for example, any of the UEs or scheduled entities shown in any of FIGS. 1, 2, 4, 5, 6, 7, 12, and 18.

The device 1900 includes a communication interface 1902 (e.g., at least one transceiver), a storage medium 1904, a user interface 1906, a memory device 1908 (e.g., storing configuration information 1918), and a processing circuit 1910 (e.g., at least one processor). In various implementations, the user interface 1906 may include one or more of a keypad, a display, a speaker, a microphone, a touchscreen display, of some other circuitry for receiving an input from or sending an output to a user. The communication interface 1902 may be coupled to one or more antennas 1912, and may include a transmitter 1914 and a receiver 1916. In general, the components of FIG. 19 may be similar to corresponding components of the UE 1200 of FIG. 12.

The processing circuit 1910 may be adapted to perform any or all of the features, processes, functions, operations and/or routines for any or all of the devices described herein. For example, the processing circuit 1910 may be configured to perform any of the steps, functions, and/or processes described with respect to FIGS. 1-11 and 14. As used herein, the term "adapted" in relation to the processing circuit 1910 may refer to the processing circuit 1910 being one or more of configured, used, implemented, and/or programmed to perform a particular process, function, operation and/or routine according to various features described herein.

The processing circuit 1910 may be a specialized processor, such as an application specific integrated circuit (ASIC) that serves as a means for (e.g., structure for) carrying out any one of the operations described in conjunction with FIGS. 1-11 and 14. The processing circuit 1910 may serve as one example of a means for transmitting and/or a means for receiving. In various implementations, the processing circuit 1910 may provide and/or incorporate, at least in part, the functionality described above for the second device 704 (e.g., the communication controller 710) of FIG. 7.

According to at least one example of the device 1900, the processing circuit 1910 may include one or more of a circuit/module for receiving 1920, a circuit/module for determining 1922, a circuit/module for obtaining 1924, or a circuit/module for abstaining 1926. In various implementations, the circuit/module for receiving 1920, the circuit/module for determining 1922, the circuit/module for obtaining 1924, or the circuit/module for abstaining 1926 may provide and/or incorporate, at least in part, the functionality described above for the second device 704 (e.g., the communication controller 710) of FIG. 7.

As mentioned above, programming stored by the storage medium 1904, when executed by the processing circuit 1910, causes the processing circuit 1910 to perform one or more of the various functions and/or process operations described herein. For example, the programming may cause the processing circuit 1910 to perform the various functions, steps, and/or processes described herein with respect to FIGS. 1-11 and 14 in various implementations. As shown in FIG. 19, the storage medium 1904 may include one or more of code for receiving 1940, code for determining 1942, code for obtaining 1944, or code for abstaining 1946. In various implementations, the code for receiving 1940, the code for determining 1942, the code for obtaining 1944, or the code for abstaining 1946 may be executed or otherwise used to provide the functionality described herein for the circuit/module for receiving 1920, the circuit/module for determining 1922, the circuit/module for obtaining 1924, or the circuit/module for abstaining 1926.

In some examples, the circuit/module for receiving 1920 of FIG. 19 (e.g., the communication controller 710 of FIG. 7) performs the operations of block 1402 and/or other similar operations as taught herein. In some examples, the code for receiving 1940 of FIG. 19 is executed to perform the operations of block 1402 and/or other similar operations as taught herein.

In some examples, the circuit/module for determining 1922 of FIG. 19 (e.g., the handover controller 722 of FIG. 7) performs the operations of block 1404 and/or other similar operations as taught herein. In some examples, the code for determining 1942 of FIG. 19 is executed to perform the operations of block 1404 and/or other similar operations as taught herein.

In some examples, the circuit/module for obtaining 1924 of FIG. 19 (e.g., the handover controller 722 of FIG. 7) performs the operations of block 1406 and/or other similar operations as taught herein. In some examples, the code for obtaining 1944 of FIG. 19 is executed to perform the operations of block 1406 and/or other similar operations as taught herein.

In some examples, the circuit/module for abstaining 1926 of FIG. 19 (e.g., the handover controller 722 of FIG. 7) performs the operations of block 1408 and/or other similar operations as taught herein. In some examples, the code for abstaining 1946 of FIG. 19 is executed to perform the operations of block 1408 and/or other similar operations as taught herein.

Figure 20:
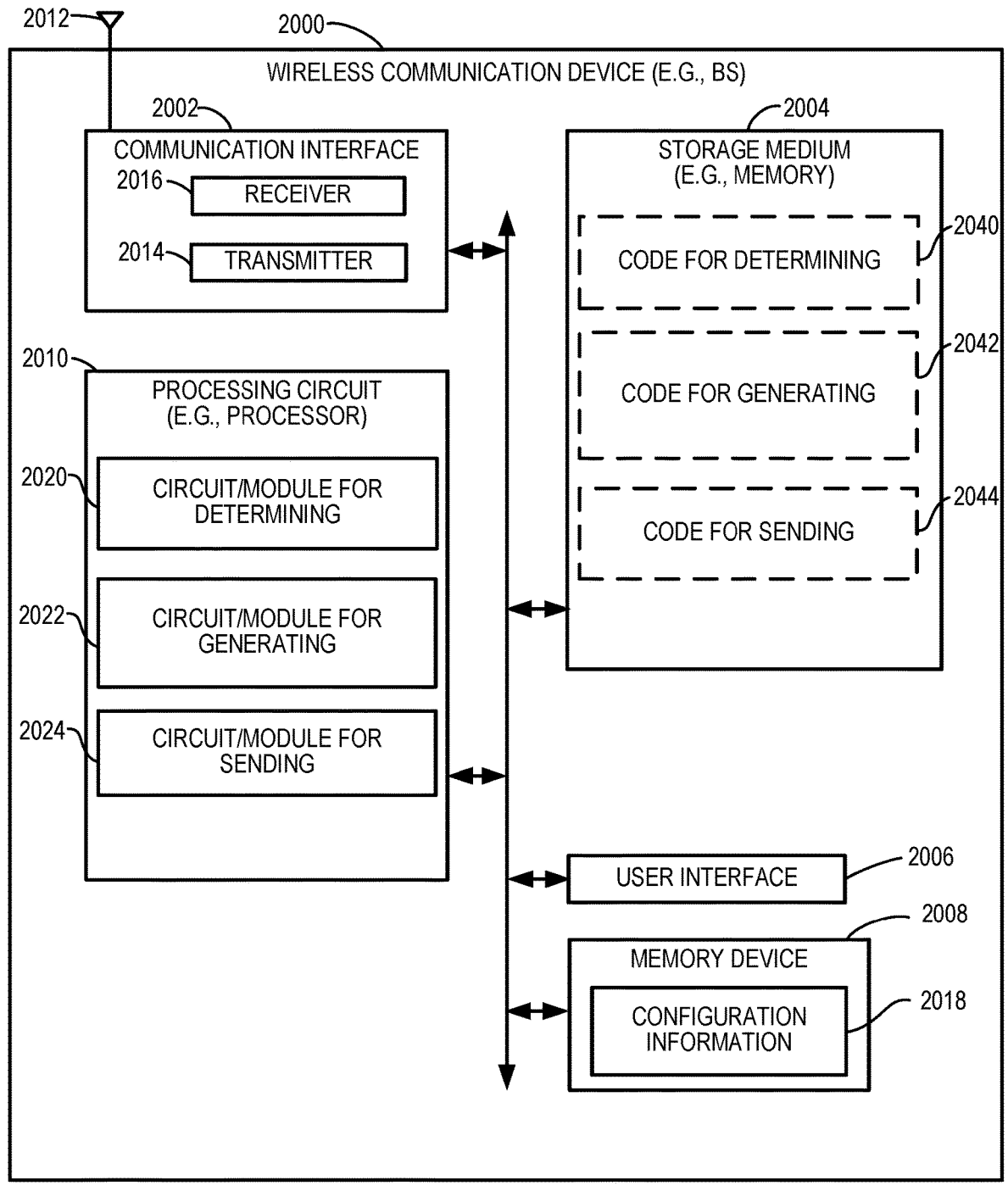
FIG. 20 is a block diagram conceptually illustrating an example hardware implementation of a device for wireless communication (e.g., a base station) according to some aspects.

FIG. 20 illustrates a block diagram of an example hardware implementation of a wireless communication device 2000 configured to communicate according to some aspects. The device 2000 could embody or be implemented within a gNB, a transmit receive point (TRP), a base station (BS), an eNode B (eNB), a CPE, a UE, a user terminal, a wireless communication system, or some other type of device that supports wireless communication. In various implementations, the device 2000 could embody or be implemented within an access terminal, an access point, or some other type of device. In various implementations, the device 2000 could embody or be implemented within a server, a personal computer, a mobile phone, a smart phone, a tablet, a portable computer, a sensor, an alarm, a vehicle, a machine, an entertainment device, a medical device, or any other electronic device having circuitry. The device 2000 may correspond at least in some aspect to, for example, any of the BSs (e.g., gNBs) or scheduling entities shown in any of FIGS. 1, 2, 4, 5, 6, 7, 15, and 21.

The device 2000 includes a communication interface (e.g., at least one transceiver) 2002, a storage medium 2004, a user interface 2006, a memory device (e.g., a memory circuit) 2008, and a processing circuit 2010 (e.g., at least one processor). In various implementations, the user interface 2006 may include one or more of a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 20. The signaling bus may include any number of interconnecting buses and bridges depending on the specific application of the processing circuit 2010 and the overall design constraints. The signaling bus links together various circuits such that each of the communication interface 2002, the storage medium 2004, the user interface 2006, and the memory device 2008 are coupled to and/or in electrical communication with the processing circuit 2010. The signaling bus may also link various other circuits (not shown) such as timing sources, peripherals, voltage regulators, and power management circuits, which are well known in the art, and therefore, will not be described any further. In general, the components of FIG. 20 may be similar to corresponding components of the BS 1500 of FIG. 15.

The processing circuit 2010 may be adapted to perform any or all of the features, processes, functions, operations and/or routines for any or all of the devices described herein. For example, the processing circuit 2010 may be configured to perform any of the steps, functions, and/or processes described with respect to FIGS. 1-11 and 16. As used herein, the term "adapted" in relation to the processing circuit 2010 may refer to the processing circuit 2010 being one or more of configured, employed, implemented, and/or programmed to perform a particular process, function, operation and/or routine according to various features described herein.

The processing circuit 2010 may be a specialized processor, such as an application-specific integrated circuit (ASIC) that serves as a means for (e.g., structure for) carrying out any one of the operations described in conjunction with FIGS. 1-11 and 16. The processing circuit 2010 serves as one example of a means for transmitting and/or a means for receiving. In various implementations, the processing circuit 2010 may provide and/or incorporate, at least in part, the functionality described above the first device 702 (e.g., the communication controller 706) of FIG. 7.

According to at least one example of the device 2000, the processing circuit 2010 may include one or more of a circuit/module for determining 2020, a circuit/module for generating 2022, or a circuit/module for sending 2024. In various implementations, the circuit/module for determining 2020, the circuit/module for generating 2022, or the circuit/module for sending 2024 may provide and/or incorporate, at least in part, the functionality described above for the first device 702 (e.g., the communication controller 706) of FIG. 7.

As mentioned above, programming stored by the storage medium 2004, when executed by the processing circuit 2010, causes the processing circuit 2010 to perform one or more of the various functions and/or process operations described herein. For example, the programming may cause the processing circuit 2010 to perform the various functions, steps, and/or processes described herein with respect to FIGS. 1-11 and 16 in various implementations. As shown in FIG. 20, the storage medium 2004 may include one or more of code for determining 2040, code for generating 2042, or code for sending 2044. In various implementations, the code for determining 2040, the code for generating 2042, or the code for sending 2044, may be executed or otherwise used to provide the functionality described herein for the circuit/module for determining 2020, the circuit/module for generating 2022, or the circuit/module for sending 2024.

In some examples, the circuit/module for determining 2020 of FIG. 20 (e.g., the handover controller 714 of FIG. 7) performs the operations of block 1602 and/or other similar operations as taught herein. In some examples, the code for determining 2040 of FIG. 20 is executed to perform the operations of block 1602 and/or other similar operations as taught herein.

In some examples, the circuit/module for generating 2022 of FIG. 20 (e.g., the communication controller 706 of FIG. 7) performs the operations of block 1604 and/or other similar operations as taught herein. In some examples, the code for generating 2042 of FIG. 20 is executed to perform the operations of block 1604 and/or other similar operations as taught herein.

In some examples, the circuit/module for sending 2024 of FIG. 20 (e.g., the transceiver 708 of FIG. 7) performs the operations of block 1606 and/or other similar operations as taught herein. In some examples, the code for sending 2046 of FIG. 20 is executed to perform the operations of block 1606 and/or other similar operations as taught herein.

Figure 21:
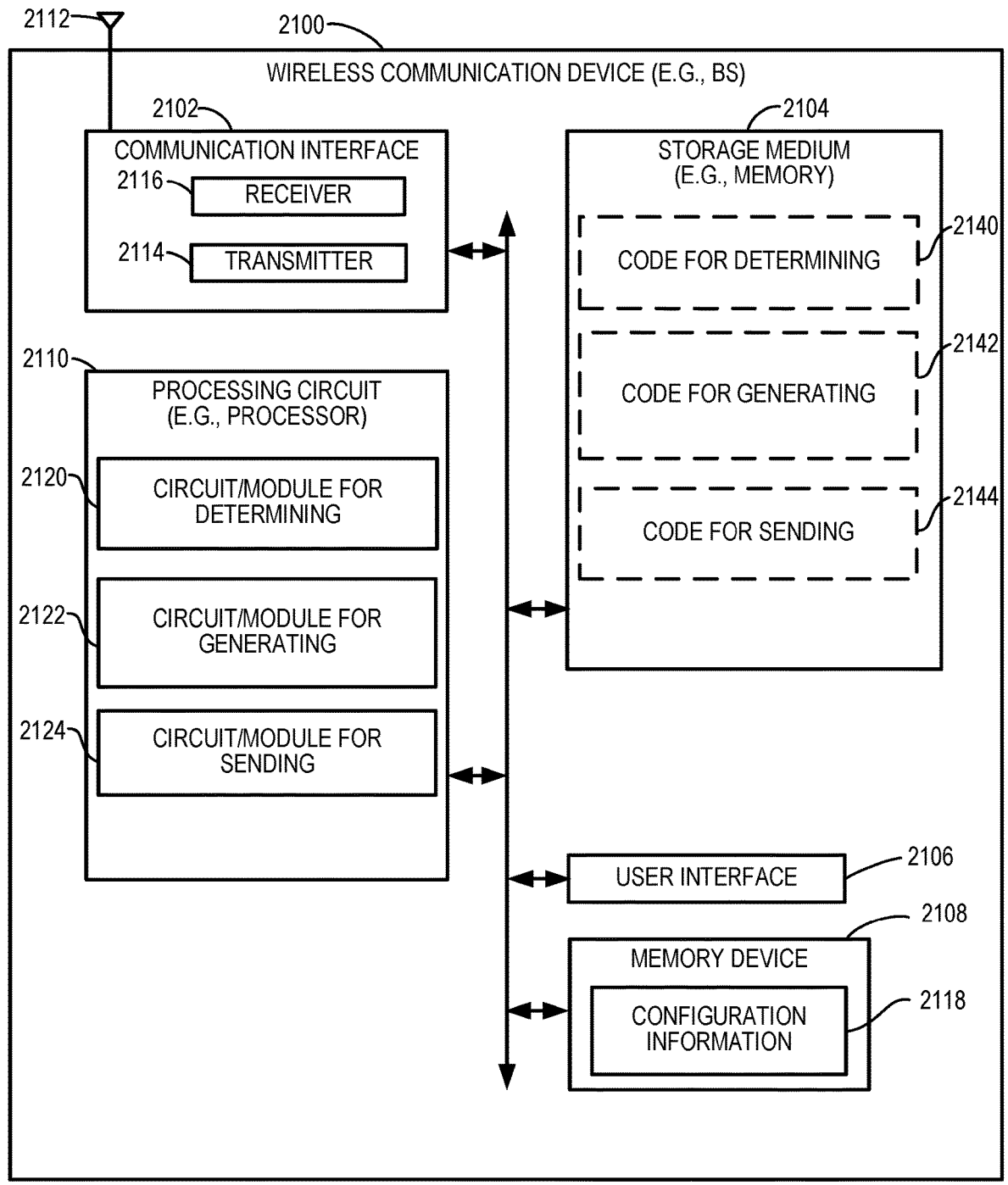
FIG. 21 is a block diagram conceptually illustrating another example hardware implementation of a device for wireless communication (e.g., a base station) according to some aspects.

FIG. 21 illustrates a block diagram of an example hardware implementation of a wireless communication device 2100 configured to communicate according to some aspects. The device 2100 could embody or be implemented within a base station (BS), a gNB, a transmit receive point (TRP), an eNode B (eNB), a CPE, or some other type of device that supports wireless communication. In various implementations, the device 2100 could embody or be implemented within an access terminal, an access point, or some other type of device. In various implementations, the device 2100 could embody or be implemented within a server, a personal computer, a mobile phone, a smart phone, a tablet, a portable computer, a sensor, an alarm, a vehicle, a machine, an entertainment device, a medical device, or any other electronic device having circuitry. The device 2100 may correspond at least in some aspect to, for example, any of the BSs (e.g., gNBs) or scheduling entities shown in any of FIGS. 1, 2, 4, 5, 6, 7, 15, and 20.

The device 2100 includes a communication interface 2102 (e.g., at least one transceiver), a storage medium 2104, a user interface 2106, a memory device 2108 (e.g., storing configuration information 2118), and a processing circuit 2110 (e.g., at least one processor). In various implementations, the user interface 2106 may include one or more of a keypad, a display, a speaker, a microphone, a touchscreen display, of some other circuitry for receiving an input from or sending an output to a user. The communication interface 2102 may be coupled to one or more antennas 2112, and may include a transmitter 2114 and a receiver 2116. In general, the components of FIG. 21 may be similar to corresponding components of the BS 1500 of FIG. 15.

The processing circuit 2110 may be adapted to perform any or all of the features, processes, functions, operations and/or routines for any or all of the devices described herein. For example, the processing circuit 2110 may be configured to perform any of the steps, functions, and/or processes described with respect to FIGS. 1-11 and 17. As used herein, the term "adapted" in relation to the processing circuit 2110 may refer to the processing circuit 2110 being one or more of configured, used, implemented, and/or programmed to perform a particular process, function, operation and/or routine according to various features described herein.

The processing circuit 2110 may be a specialized processor, such as an application specific integrated circuit (ASIC) that serves as a means for (e.g., structure for) carrying out any one of the operations described in conjunction with FIGS. 1-11 and 17. The processing circuit 2110 may serve as one example of a means for transmitting and/or a means for receiving. In various implementations, the processing circuit 2110 may provide and/or incorporate, at least in part, the functionality described above for the first device 702 (e.g., the communication controller 706) of FIG. 7.

According to at least one example of the device 2100, the processing circuit 2110 may include one or more of a circuit/module for determining 2120, a circuit/module for generating 2122, or a circuit/module for sending 2124. In various implementations, the circuit/module for determining 2120, the circuit/module for generating 2122, or the circuit/module for sending 2124 may provide and/or incorporate, at least in part, the functionality described above for the first device 702 (e.g., the communication controller 706) of FIG. 7.

As mentioned above, programming stored by the storage medium 2104, when executed by the processing circuit 2110, causes the processing circuit 2110 to perform one or more of the various functions and/or process operations described herein. For example, the programming may cause the processing circuit 2110 to perform the various functions, steps, and/or processes described herein with respect to FIGS. 1-11 and 17 in various implementations. As shown in FIG. 21, the storage medium 2104 may include one or more of code for determining 2140, code for generating 2142, or code for sending 2144. In various implementations, the code for determining 2140, the code for generating 2142, or the code for sending 2144 may be executed or otherwise used to provide the functionality described herein for the circuit/module for determining 2120, the circuit/module for generating 2122, or the circuit/module for sending 2124.

In some examples, the circuit/module for determining 2120 of FIG. 21 (e.g., the handover controller 714 of FIG. 7) performs the operations of block 1702 and/or other similar operations as taught herein. In some examples, the code for determining 2140 of FIG. 21 is executed to perform the operations of block 1702 and/or other similar operations as taught herein.

In some examples, the circuit/module for generating 2122 of FIG. 21 (e.g., the communication controller 706 of FIG. 7) performs the operations of block 1704 and/or other similar operations as taught herein. In some examples, the code for generating 2142 of FIG. 21 is executed to perform the operations of block 1704 and/or other similar operations as taught herein.

In some examples, the circuit/module for sending 2124 of FIG. 21 (e.g., the transceiver 708 of FIG. 7) performs the operations of block 1706 and/or other similar operations as taught herein. In some examples, the code for sending 2146 of FIG. 21 is executed to perform the operations of block 1706 and/or other similar operations as taught herein.

Aspect 1: A method for wireless communication at a wireless communication device, comprising: using a source configuration for master cell group (MCG) connectivity; receiving a message associated with handover of the wireless communication device from the MCG connectivity to multiple radio access technology-dual connectivity (MR-DC); determining that the message does not include a full configuration indication; and configuring a secondary cell group (SCG) configuration for the MR-DC by reusing the source configuration as a result of the determining that the message does not include the full configuration indication.

Aspect 2: The method of aspect 1, wherein the SCG configuration comprises at least one of: a service data adaptation protocol (SDAP) configuration of a data radio bearer (DRB), a packet data convergence protocol (PDCP) configuration of a DRB, a physical layer configuration, a medium access control (MAC) layer configuration, a radio link control (RLC) configuration of a DRB, or any combination thereof.

Aspect 3: The method of aspect 1 or 2, further comprising: abstaining from reusing a third configuration associated with the MCG connectivity for the source configuration as a result of the determining that the message does not include the full configuration indication.

Aspect 4: The method of aspect 3, wherein the third configuration comprises at least one security configuration.

Aspect 5: The method of any of aspects 1 through 4, wherein the full configuration indication comprises a fullConfig information element (fullConfig IE).

Aspect 6: The method of any of aspects 1 through 5, wherein: the MCG connectivity is associated with third generation partnership project (3GPP) new radio (NR) connectivity; and the MR-DC is associated with 3GPP evolved universal terrestrial radio access (E-UTRA)-NR dual connectivity (EN-DC).

Aspect 7: The method of any of aspects 1 through 6, wherein: the wireless communication device is served by a third generation partnership project (3GPP) next-generation-radio access network (NG-RAN) node during the MCG connectivity; and the 3GPP NG-RAN node is associated with an SCG for the MR-DC.

Aspect 8: The method of any of aspects 1 through 7, wherein the message indicates whether a full SCG configuration is provided in the message.

Aspect 9: The method of any of aspects 1 through 8, further comprising: abstaining from reusing at least one security configuration associated with the MCG connectivity for the source configuration as a result of the determining.

Aspect 10: The method of any of aspects 1 through 9, wherein the message comprises a radio resource control (RRC) connection reconfiguration message.

Aspect 11: The method of any of aspects 1 through 10, further comprising: determining that the message comprises an nr-SecondaryCellGroupConfig information element (IE); and applying a configuration provided in the IE.

Aspect 13: A method for wireless communication at a wireless communication device, comprising: receiving a message associated with handover of the wireless communication device from a first connectivity mode to a second connectivity mode, wherein at least one of the first connectivity mode or the second connectivity mode is a multi-connectivity mode; determining that the message indicates that the wireless communication device is to reuse a first configuration associated with the first connectivity mode for the second connectivity mode; and obtaining a second configuration for the second connectivity mode based on the first configuration as a result of the determining that the message indicates that the wireless communication device is to reuse the first configuration.

Aspect 14: The method of aspect 13, wherein the multi-connectivity mode comprises a dual-connectivity mode or a multi-radio access technology (multi-RAT) dual-connectivity mode.

Aspect 15: The method of any of aspects 13 through 14, wherein the first configuration comprises a data radio bearer (DRB) configuration.

Aspect 16: The method of any of aspects 13 through 15, further comprising: abstaining from reusing a third configuration associated with the first connectivity mode for the second configuration as a result of the determining that the message indicates that the wireless communication device is to reuse the first configuration.

Aspect 17: The method of aspect 16, wherein the third configuration comprises at least one security configuration.

Aspect 18: The method of any of aspects 13 through 17, wherein: the first connectivity mode comprises third generation partnership project (3GPP) new radio (NR) standalone connectivity; the second connectivity mode comprises NR dual connectivity (NR-DC); the first configuration comprises at least one of: a service data adaptation protocol (SDAP) configuration of a radio bearer (RB), a packet data convergence protocol (PDCP) configuration of an RB, a physical layer configuration, a medium access control (MAC) layer configuration, a radio link control (RLC) configuration of an RB, or any combination thereof; the wireless communication device is served by a 3GPP next-generation-radio access network (NG-RAN) node during the first connectivity mode; and the 3GPP NG-RAN node is associated with a secondary cell group (SCG) for the second connectivity mode.

Aspect 19: The method of any of aspects 13 through 18, wherein: the first connectivity mode comprises third generation partnership project (3GPP) long term evolution (LTE) standalone connectivity; the second connectivity mode comprises LTE dual connectivity (LTE-DC); the first configuration comprises at least one of: a service data adaptation protocol (SDAP) configuration of a radio bearer (RB), a packet data convergence protocol (PDCP) configuration of an RB, a physical layer configuration, a medium access control (MAC) layer configuration, a radio link control (RLC) configuration of an RB, or any combination thereof; the wireless communication device is served by a 3GPP evolved universal terrestrial radio access (E-UTRA) node during the first connectivity mode; and the 3GPP E-UTRA node is associated with a secondary cell group (SCG) for the second connectivity mode.

Aspect 20: The method of any of aspects 13 through 19, wherein: the first connectivity mode comprises third generation partnership project (3GPP) evolved universal terrestrial radio access (E-UTRA)-NR dual connectivity (EN-DC); the second connectivity mode comprises NR standalone connectivity; the first configuration comprises at least one of: a service data adaptation protocol (SDAP) configuration of a radio bearer (RB), a packet data convergence protocol (PDCP) configuration of an RB, a physical layer configuration, a medium access control (MAC) layer configuration, a radio link control (RLC) configuration of an RB, or any combination thereof; a secondary cell group (SCG) for the first connectivity mode comprises a 3GPP next-generation-radio access network (NG-RAN) node; and the wireless communication device is served by the 3GPP NG-RAN node during the second connectivity mode.

Aspect 21: The method of any of aspects 13 through 20, wherein: the first connectivity mode comprises third generation partnership project (3GPP) 3GPP evolved universal terrestrial radio access (E-UTRA)-NR dual connectivity (EN-DC); the second connectivity mode comprises NR dual connectivity (NR-DC); the first configuration comprises at least one of: a service data adaptation protocol (SDAP) configuration of a radio bearer (RB), a packet data convergence protocol (PDCP) configuration of an RB, a physical layer configuration, a medium access control (MAC) layer configuration, a radio link control (RLC) configuration of an RB, or any combination thereof; a secondary cell group (SCG) for the first connectivity mode comprises a 3GPP next-generation-radio access network (NG-RAN) node; and the 3GPP NG-RAN node comprises a master cell group (MCG) during the second connectivity mode.

Aspect 22: The method of any of aspects 13 through 21, wherein: the first connectivity mode comprises third generation partnership project (3GPP) new radio (NR) connectivity; the second connectivity mode comprises 3GPP evolved universal terrestrial radio access (E-UTRA)-NR dual connectivity (EN-DC); the first configuration comprises at least one of: a service data adaptation protocol (SDAP) configuration of a radio bearer (RB), a packet data convergence protocol (PDCP) configuration of an RB, a physical layer configuration, a medium access control (MAC) layer configuration, a radio link control (RLC) configuration of an RB, or any combination thereof; the wireless communication device is served by a 3GPP next-generation-radio access network (NG-RAN) node during the first connectivity mode; and the 3GPP NG-RAN node is associated with a secondary cell group (SCG) during the second connectivity mode.

Aspect 23: The method of any of aspects 13 through 22, wherein the message comprises an indication of whether a full master cell group (MCG) configuration is provided in the message.

Aspect 24: The method of any of aspects 13 through 23, wherein the message comprises an indication of whether a full secondary cell group (SCG) configuration is provided in the message.

Aspect 25: The method of any of aspects 13 through 24, wherein the message comprises a fullConfig information element (fullConfig IE).

Aspect 26: The method of any of aspects 13 through 25, wherein: the first connectivity mode comprises a standalone connectivity mode; and the second connectivity mode comprises a dual connectivity mode.

Aspect 27: The method of any of aspects 13 through 26, wherein: the first connectivity mode comprises a dual connectivity mode; and the second connectivity mode comprises a standalone connectivity mode.

Aspect 28: The method of any of aspects 13 through 27, wherein: the first connectivity mode comprises a first dual connectivity mode; and the second connectivity mode comprises a second dual connectivity mode.

Aspect 29: The method of any of aspects 13 through 28, wherein: the first connectivity mode comprises a first third generation partnership project (3GPP) new radio (NR) connectivity mode; and the second connectivity mode comprises a second 3GPP NR connectivity mode.

Aspect 30: A wireless communication device comprising: a transceiver configured to communicate with a radio access network, a memory, and a processor communicatively coupled to the transceiver and the memory, wherein the processor and the memory are configured to perform any one of aspects 1 through 11.

Aspect 31: An apparatus configured for wireless communication comprising at least one means for performing any one of aspects 1 through 11.

Aspect 32: A non-transitory computer-readable medium storing computer-executable code, comprising code for causing an apparatus to perform any one of aspects 1 through 11.

Aspect 33: A wireless communication device comprising: a transceiver configured to communicate with a radio access network, a memory, and a processor communicatively coupled to the transceiver and the memory, wherein the processor and the memory are configured to perform any one of aspects 13 through 29.

Aspect 34: An apparatus configured for wireless communication comprising at least one means for performing any one of aspects 13 through 29.

Aspect 35: A non-transitory computer-readable medium storing computer-executable code, comprising code for causing an apparatus to perform any one of aspects 13 through 29.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may encompass a wide variety of actions. For example, "determining" may include calculating, computing, processing, deriving, investigating, looking up (e.g., looking up in a table, a database or another data structure), ascertaining, resolving, selecting, choosing, establishing, receiving (e.g., receiving information), accessing (e.g., accessing data in a memory), and the like.

One or more of the components, steps, features and/or functions illustrated in FIGS. 1-21 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4-7, 12, 15, and 18-21 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a wireless communication device, comprising:
 using a source configuration for master cell group (MCG) connectivity;

receiving a message associated with handover of the wireless communication device from the MCG connectivity to multiple radio access technology-dual connectivity (MR-DC);

determining that the message does not include a full configuration indication; and configuring a secondary cell group (SCG) configuration for the MR-DC by reusing the source configuration as a result of the determining that the message does not include the full configuration indication.

2. The method of claim 1, wherein the SCG configuration comprises at least one of: a service data adaptation protocol (SDAP) configuration of a data radio bearer (DRB), a packet data convergence protocol (PDCP) configuration of a DRB, a physical layer configuration, a medium access control (MAC) layer configuration, a radio link control (RLC) configuration of a DRB, or any combination thereof.

3. The method of claim 1, further comprising:
abstaining from reusing a third configuration associated with the MCG connectivity for the source configuration as a result of the determining that the message does not include the full configuration indication.

4. The method of claim 3, wherein the third configuration comprises at least one security configuration.

5. The method of claim 1, wherein the full configuration indication comprises a fullConfig information element (fullConfig IE).

6. The method of claim 1, wherein:
the MCG connectivity is associated with third generation partnership project (3GPP) new radio (NR) connectivity; and
the MR-DC is associated with 3GPP evolved universal terrestrial radio access (E-UTRA)-NR dual connectivity (EN-DC).

7. The method of claim 1, wherein:
the wireless communication device is served by a third generation partnership project (3GPP) next-generation-radio access network (NG-RAN) node during the MCG connectivity; and
the 3GPP NG-RAN node is associated with an SCG for the MR-DC.

8. The method of claim 1, wherein the message indicates whether a full SCG configuration is provided in the message.

9. A wireless communication device, comprising:
a transceiver;
a memory; and
a processor communicatively coupled to the transceiver and the memory, wherein the processor and the memory are configured to:
use a source configuration for a master cell group (MCG) connectivity,
receive a message associated with handover of the wireless communication device from the MCG connectivity to multiple radio access technology-dual connectivity (MR-DC),
determine that the message does not include a full configuration indication, and
configure a secondary cell group (SCG) configuration for the MCG connectivity by reusing the source configuration as a result of the determination that the message does not include the full configuration indication.

10. The wireless communication device of claim 9, wherein the processor and the memory are further configured to:
abstain from reusing at least one security configuration associated with the MCG connectivity for the source configuration as a result of the determination that the message does not include the full configuration indication.

11. The wireless communication device of claim 9, wherein:
the full configuration indication comprises a fullConfig information element (fullConfig IE);
the message comprises a radio resource control (RRC) connection reconfiguration message; and
the message indicates whether a full SCG configuration is provided in the message.

12. The wireless communication device of claim 9, wherein the processor and the memory are further configured to:
determine that the message comprises an nr-SecondaryCellGroupConfig information element (IE); and
apply a configuration provided in the IE.

13. A method for wireless communication at a wireless communication device, comprising:
receiving a message associated with handover of the wireless communication device from a first connectivity mode to a second connectivity mode, wherein at least one of the first connectivity mode or the second connectivity mode is a multi-connectivity mode;
determining that the message indicates that the wireless communication device is to reuse a first configuration associated with the first connectivity mode for the second connectivity mode; and
obtaining a second configuration for the second connectivity mode based on the first configuration as a result of the determining that the message indicates that the wireless communication device is to reuse the first configuration.

14. The method of claim 13, wherein the multi-connectivity mode comprises a dual-connectivity mode or a multi-radio access technology (multi-RAT) dual-connectivity mode.

15. The method of claim 13, wherein the first configuration comprises a data radio bearer (DRB) configuration.

16. The method of claim 13, further comprising:
abstaining from reusing a third configuration associated with the first connectivity mode for the second configuration as a result of the determining that the message indicates that the wireless communication device is to reuse the first configuration.

17. The method of claim 16, wherein the third configuration comprises at least one security configuration.

18. The method of claim 13, wherein:
the first connectivity mode comprises third generation partnership project (3GPP) new radio (NR) standalone connectivity;
the second connectivity mode comprises NR dual connectivity (NR-DC);
the first configuration comprises at least one of: a service data adaptation protocol (SDAP) configuration of a radio bearer (RB), a packet data convergence protocol (PDCP) configuration of an RB, a physical layer configuration, a medium access control (MAC) layer configuration, a radio link control (RLC) configuration of an RB, or any combination thereof;
the wireless communication device is served by a 3GPP next-generation-radio access network (NG-RAN) node during the first connectivity mode; and
the 3GPP NG-RAN node is associated with a secondary cell group (SCG) for the second connectivity mode.

19. The method of claim 13, wherein:
the first connectivity mode comprises third generation partnership project (3GPP) long term evolution (LTE) standalone connectivity;
the second connectivity mode comprises LTE dual connectivity (LTE-DC);
the first configuration comprises at least one of: a service data adaptation protocol (SDAP) configuration of a radio bearer (RB), a packet data convergence protocol (PDCP) configuration of an RB, a physical layer configuration, a medium access control (MAC) layer configuration, a radio link control (RLC) configuration of an RB, or any combination thereof;
the wireless communication device is served by a 3GPP evolved universal terrestrial radio access (E-UTRA) node during the first connectivity mode; and
the 3GPP E-UTRA node is associated with a secondary cell group (SCG) for the second connectivity mode.

20. The method of claim 13, wherein:
the first connectivity mode comprises third generation partnership project (3GPP) evolved universal terrestrial radio access (E-UTRA)-NR dual connectivity (EN-DC);
the second connectivity mode comprises NR standalone connectivity;
the first configuration comprises at least one of: a service data adaptation protocol (SDAP) configuration of a radio bearer (RB), a packet data convergence protocol (PDCP) configuration of an RB, a physical layer configuration, a medium access control (MAC) layer configuration, a radio link control (RLC) configuration of an RB, or any combination thereof;
a secondary cell group (SCG) for the first connectivity mode comprises a 3GPP next-generation-radio access network (NG-RAN) node; and
the wireless communication device is served by the 3GPP NG-RAN node during the second connectivity mode.

21. The method of claim 13, wherein:
the first connectivity mode comprises third generation partnership project (3GPP) 3GPP) evolved universal terrestrial radio access (E-UTRA)-NR dual connectivity (EN-DC);
the second connectivity mode comprises NR dual connectivity (NR-DC);
the first configuration comprises at least one of: a service data adaptation protocol (SDAP) configuration of a radio bearer (RB), a packet data convergence protocol (PDCP) configuration of an RB, a physical layer configuration, a medium access control (MAC) layer configuration, a radio link control (RLC) configuration of an RB, or any combination thereof;
a secondary cell group (SCG) for the first connectivity mode comprises a 3GPP next-generation-radio access network (NG-RAN) node; and
the 3GPP NG-RAN node comprises a master cell group (MCG) during the second connectivity mode.

22. The method of claim 13, wherein:
the first connectivity mode comprises third generation partnership project (3GPP) new radio (NR) connectivity;
the second connectivity mode comprises 3GPP evolved universal terrestrial radio access (E-UTRA)-NR dual connectivity (EN-DC);
the first configuration comprises at least one of: a service data adaptation protocol (SDAP) configuration of a radio bearer (RB), a packet data convergence protocol (PDCP) configuration of an RB, a physical layer configuration, a medium access control (MAC) layer configuration, a radio link control (RLC) configuration of an RB, or any combination thereof;
the wireless communication device is served by a 3GPP next-generation-radio access network (NG-RAN) node during the first connectivity mode; and
the 3GPP NG-RAN node is associated with a secondary cell group (SCG) during the second connectivity mode.

23. A wireless communication device, comprising:
a transceiver;
a memory; and
a processor communicatively coupled to the transceiver and the memory, wherein the processor and the memory are configured to:
receive a message associated with handover of the wireless communication device from a first connectivity mode to a second connectivity mode, wherein at least one of the first connectivity mode or the second connectivity mode is a multi-connectivity mode;
determine that the message indicates that the wireless communication device is to reuse a first configuration associated with the first connectivity mode for the second connectivity mode; and
obtain a second configuration for the second connectivity mode based on the first configuration as a result of the determination that the message indicates that the wireless communication device is to reuse the first configuration.

24. The wireless communication device of claim 23, wherein the message comprises an indication of whether a full master cell group (MCG) configuration is provided in the message.

25. The wireless communication device of claim 23, wherein the message comprises an indication of whether a full secondary cell group (SCG) configuration is provided in the message.

26. The wireless communication device of claim 23, wherein the message comprises a fullConfig information element (fullConfig IE).

27. The wireless communication device of claim 23, wherein:
the first connectivity mode comprises a standalone connectivity mode; and
the second connectivity mode comprises a dual connectivity mode.

28. The wireless communication device of claim 23, wherein:
the first connectivity mode comprises a dual connectivity mode; and
the second connectivity mode comprises a standalone connectivity mode.

29. The wireless communication device of claim 23, wherein:
the first connectivity mode comprises a first dual connectivity mode; and
the second connectivity mode comprises a second dual connectivity mode.

30. The wireless communication device of claim 23, wherein:
the first connectivity mode comprises a first third generation partnership project (3GPP) new radio (NR) connectivity mode; and
the second connectivity mode comprises a second 3GPP NR connectivity mode.

* * * * *